United States Patent [19]

Pastor et al.

[11] Patent Number: 4,574,357
[45] Date of Patent: Mar. 4, 1986

[54] REAL TIME CHARACTER THINNING SYSTEM

[75] Inventors: José Pastor, Westport; Harry L. Parker; David H. Wilson, both of Fairfield, all of Conn.

[73] Assignee: Pitney Bowes Inc., Stamford, Conn.

[21] Appl. No.: 582,109

[22] Filed: Feb. 21, 1984

[51] Int. Cl.[4] ............................................. G06K 9/44
[52] U.S. Cl. .................................. 364/518; 364/521; 382/55; 382/49; 382/42
[58] Field of Search ............... 364/518, 521, 728, 724; 382/55, 49, 42; 358/260, 133, 138

[56] References Cited

U.S. PATENT DOCUMENTS

| | | | |
|---|---|---|---|
| 3,339,179 | 8/1967 | Shelton, Jr. et al. | 382/55 |
| 3,846,754 | 11/1974 | Oku et al. | 382/55 |
| 3,940,737 | 2/1976 | Beun | 382/49 |
| 3,975,709 | 8/1976 | Beun et al. | 382/49 |
| 4,034,344 | 7/1977 | Savaga et al. | 382/49 |
| 4,155,760 | 9/1978 | Ito | 382/55 |
| 4,162,482 | 7/1979 | Su | 382/55 |
| 4,330,835 | 5/1982 | Pratt et al. | 382/42 |

Primary Examiner—Edward J. Wise
Attorney, Agent, or Firm—Melvin J. Scolnick

[57] ABSTRACT

A system for providing a video output signal representing a thinned image from digitized video input signals representing discrete picture elements (pixels) of a scanned image, comprising convolver means for identifying those pixels which are to be retained as part of the thinned image, those pixels which are to be discarded, and contingent pixels which may be part of the thinned image, and matrix filter means electrically coupled to the convolver means for determining which of the contingent pixels are to be discarded and which of the contingent pixels are to be retained as apart of the video output signal representing a thinned image.

35 Claims, 30 Drawing Figures

FIG. 10

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 3 | 0 | 3 | 3 | 3 | 3 | 0 | 0 | 3 | 3 | 3 | 3 | 3 | 2 | 0 |
| 0001 | 3 | 3 | 3 | 3 | 3 | 3 | 3 | 3 | 3 | 3 | 3 | 3 | 0 | 3 | 0 | 2 |
| 0010 | 0 | 3 | 0 | 3 | 3 | 3 | 3 | 3 | 0 | 3 | 3 | 3 | 3 | 3 | 3 | 3 |
| 0011 | 3 | 3 | 3 | 3 | 3 | 3 | 3 | 3 | 2 | 3 | 3 | 3 | 0 | 3 | 0 | 2 |
| 0100 | 3 | 3 | 3 | 3 | 3 | 3 | 3 | 3 | 3 | 3 | 3 | 3 | 3 | 3 | 3 | 3 |
| 0101 | 3 | 3 | 3 | 3 | 3 | 3 | 3 | 3 | 3 | 3 | 3 | 3 | 3 | 3 | 3 | 0 |
| 0110 | 3 | 3 | 3 | 3 | 3 | 3 | 3 | 3 | 3 | 3 | 3 | 3 | 3 | 3 | 3 | 3 |
| 0111 | 0 | 3 | 3 | 3 | 3 | 3 | 3 | 3 | 0 | 3 | 3 | 3 | 2 | 2 | 2 | 2 |
| 1000 | 0 | 3 | 0 | 2 | 3 | 3 | 3 | 0 | 3 | 3 | 3 | 3 | 3 | 3 | 3 | 0 |
| 1001 | 3 | 3 | 3 | 3 | 3 | 3 | 3 | 3 | 3 | 3 | 3 | 3 | 3 | 3 | 3 | 2 |
| 1010 | 3 | 3 | 3 | 3 | 3 | 3 | 3 | 3 | 3 | 0 | 3 | 3 | 3 | 3 | 3 | 3 |
| 1011 | 3 | 3 | 3 | 3 | 3 | 3 | 3 | 3 | 3 | 3 | 3 | 3 | 3 | 3 | 3 | 2 |
| 1100 | 3 | 0 | 3 | 0 | 3 | 3 | 3 | 2 | 3 | 3 | 3 | 3 | 3 | 3 | 3 | 2 |
| 1101 | 3 | 3 | 3 | 3 | 3 | 3 | 3 | 2 | 3 | 3 | 3 | 3 | 3 | 3 | 3 | 2 |
| 1110 | 2 | 0 | 3 | 0 | 3 | 3 | 3 | 2 | 3 | 3 | 3 | 3 | 3 | 3 | 3 | 2 |
| 1111 | 3 | 2 | 3 | 2 | 3 | 3 | 3 | 2 | 0 | 2 | 3 | 2 | 2 | 2 | 2 | 2 |

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 0 | 0 | 0 | 0 | 3 | 0 | 0 | 0 | 0 | 0 | 0 | 0 | 0 | 0 | 0 |
| 0001 | 0 | 0 | 0 | 0 | 3 | 3 | 0 | 3 | 0 | 0 | 0 | 0 | 3 | 0 | 0 | 0 |
| 0010 | 0 | 0 | 0 | 0 | 0 | 0 | 0 | 3 | 0 | 0 | 0 | 0 | 0 | 0 | 0 | 3 |
| 0011 | 0 | 0 | 0 | 0 | 0 | 3 | 0 | 3 | 0 | 0 | 0 | 0 | 0 | 0 | 0 | 0 |
| 0100 | 0 | 3 | 0 | 0 | 0 | 3 | 0 | 3 | 0 | 0 | 0 | 0 | 3 | 0 | 0 | 0 |
| 0101 | 3 | 3 | 0 | 3 | 3 | 3 | 3 | 3 | 0 | 3 | 0 | 0 | 3 | 3 | 0 | 0 |
| 0110 | 0 | 0 | 0 | 0 | 0 | 3 | 0 | 3 | 0 | 0 | 0 | 3 | 0 | 0 | 0 | 3 |
| 0111 | 0 | 3 | 3 | 3 | 3 | 3 | 3 | 3 | 0 | 0 | 3 | 3 | 0 | 0 | 0 | 0 |
| 1000 | 0 | 0 | 0 | 0 | 0 | 0 | 0 | 0 | 0 | 0 | 0 | 0 | 0 | 0 | 0 | 0 |
| 1001 | 0 | 0 | 0 | 0 | 0 | 3 | 0 | 0 | 0 | 0 | 0 | 0 | 0 | 3 | 3 | 0 |
| 1010 | 0 | 0 | 0 | 0 | 0 | 0 | 0 | 3 | 0 | 0 | 0 | 0 | 0 | 3 | 0 | 0 |
| 1011 | 0 | 0 | 0 | 0 | 0 | 0 | 3 | 3 | 0 | 0 | 0 | 0 | 0 | 3 | 0 | 0 |
| 1100 | 0 | 0 | 0 | 0 | 0 | 3 | 0 | 0 | 0 | 3 | 0 | 0 | 0 | 3 | 0 | 0 |
| 1101 | 0 | 3 | 0 | 0 | 3 | 3 | 0 | 0 | 0 | 3 | 3 | 3 | 3 | 3 | 3 | 0 |
| 1110 | 0 | 0 | 0 | 0 | 0 | 0 | 0 | 0 | 3 | 0 | 0 | 0 | 3 | 0 | 0 | 0 |
| 1111 | 0 | 0 | 3 | 0 | 0 | 0 | 0 | 0 | 0 | 0 | 3 | 0 | 0 | 0 | 0 | 0 |

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 0 | 0 | 0 | 0 | 0 | 0 | 0 | 0 | 3 | 3 | 3 | 0 | 3 | 0 | 0 |
| 0001 | 0 | 3 | 3 | 3 | 0 | 0 | 0 | 0 | 0 | 3 | 3 | 3 | 0 | 0 | 0 | 0 |
| 0010 | 0 | 3 | 3 | 3 | 3 | 3 | 3 | 3 | 3 | 3 | 3 | 3 | 3 | 3 | 3 | 3 |
| 0011 | 0 | 3 | 3 | 3 | 0 | 0 | 0 | 0 | 0 | 3 | 3 | 3 | 0 | 0 | 0 | 0 |
| 0100 | 0 | 0 | 3 | 0 | 3 | 0 | 3 | 0 | 3 | 3 | 3 | 3 | 3 | 0 | 3 | 0 |
| 0101 | 0 | 0 | 3 | 0 | 0 | 0 | 0 | 0 | 0 | 0 | 3 | 0 | 0 | 0 | 3 | 0 |
| 0110 | 0 | 0 | 3 | 0 | 3 | 0 | 3 | 0 | 3 | 3 | 3 | 3 | 3 | 0 | 3 | 0 |
| 0111 | 0 | 0 | 3 | 0 | 0 | 0 | 0 | 0 | 0 | 0 | 0 | 0 | 0 | 0 | 0 | 0 |
| 1000 | 0 | 0 | 3 | 0 | 3 | 0 | 3 | 0 | 3 | 3 | 3 | 3 | 3 | 0 | 3 | 0 |
| 1001 | 3 | 3 | 3 | 3 | 3 | 0 | 3 | 0 | 3 | 3 | 3 | 3 | 3 | 0 | 3 | 0 |
| 1010 | 3 | 3 | 3 | 3 | 3 | 3 | 3 | 0 | 3 | 3 | 3 | 3 | 3 | 3 | 3 | 3 |
| 1011 | 3 | 3 | 3 | 3 | 3 | 0 | 3 | 0 | 3 | 3 | 3 | 3 | 3 | 0 | 0 | 0 |
| 1100 | 0 | 0 | 3 | 0 | 3 | 0 | 3 | 0 | 3 | 3 | 3 | 3 | 3 | 0 | 3 | 0 |
| 1101 | 3 | 0 | 3 | 0 | 0 | 0 | 0 | 0 | 0 | 0 | 3 | 0 | 0 | 0 | 0 | 0 |
| 1110 | 0 | 0 | 3 | 0 | 3 | 3 | 3 | 0 | 3 | 3 | 3 | 0 | 3 | 0 | 3 | 0 |
| 1111 | 0 | 0 | 3 | 0 | 0 | 0 | 0 | 0 | 0 | 0 | 3 | 0 | 0 | 0 | 0 | 0 |

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 0 | 0 | 0 | 0 | 3 | 0 | 0 | 0 | 3 | 0 | 3 | 0 | 3 | 0 | 0 |
| 0001 | 0 | 0 | 3 | 3 | 3 | 3 | 3 | 0 | 3 | 3 | 0 | 0 | 3 | 3 | 0 | 0 |
| 0010 | 0 | 3 | 0 | 3 | 3 | 3 | 3 | 0 | 3 | 0 | 3 | 3 | 3 | 3 | 3 | 3 |
| 0011 | 0 | 3 | 3 | 3 | 3 | 3 | 3 | 0 | 3 | 3 | 3 | 0 | 3 | 3 | 3 | 3 |
| 0100 | 0 | 3 | 3 | 3 | 0 | 3 | 3 | 3 | 3 | 3 | 3 | 3 | 3 | 3 | 3 | 3 |
| 0101 | 3 | 3 | 3 | 3 | 3 | 0 | 3 | 0 | 3 | 3 | 3 | 3 | 0 | 3 | 3 | 0 |
| 0110 | 0 | 3 | 3 | 3 | 3 | 3 | 3 | 3 | 3 | 3 | 3 | 0 | 3 | 3 | 3 | 3 |
| 0111 | 0 | 3 | 3 | 3 | 3 | 0 | 3 | 3 | 3 | 3 | 3 | 0 | 0 | 3 | 0 | 0 |
| 1000 | 0 | 0 | 0 | 0 | 3 | 3 | 3 | 0 | 3 | 0 | 3 | 3 | 3 | 3 | 3 | 3 |
| 1001 | 3 | 3 | 3 | 3 | 3 | 3 | 3 | 3 | 3 | 3 | 3 | 3 | 3 | 3 | 3 | 3 |
| 1010 | 0 | 3 | 0 | 3 | 3 | 3 | 3 | 0 | 3 | 0 | 3 | 3 | 3 | 3 | 3 | 3 |
| 1011 | 3 | 0 | 3 | 3 | 3 | 3 | 3 | 3 | 3 | 3 | 3 | 3 | 3 | 3 | 3 | 3 |
| 1100 | 0 | 0 | 3 | 0 | 3 | 3 | 0 | 0 | 3 | 3 | 3 | 3 | 3 | 3 | 3 | 3 |
| 1101 | 3 | 3 | 3 | 3 | 0 | 3 | 0 | 3 | 3 | 3 | 3 | 3 | 3 | 3 | 3 | 0 |
| 1110 | 0 | 3 | 3 | 3 | 3 | 3 | 3 | 3 | 3 | 3 | 3 | 3 | 3 | 3 | 3 | 3 |
| 1111 | 0 | 0 | 3 | 3 | 3 | 0 | 3 | 0 | 3 | 3 | 3 | 3 | 3 | 0 | 3 | 0 |

380

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 0 | 0 | 0 | 0 | 0 | 0 | 0 | 0 | 0 | 0 | 0 | 0 | 0 | 0 | 0 |
| 0001 | 0 | 0 | 0 | 0 | 0 | 0 | 0 | 0 | 0 | 0 | 0 | 0 | 0 | 0 | 0 | 0 |
| 0010 | 0 | 0 | 0 | 0 | 0 | 0 | 0 | 0 | 0 | 0 | 0 | 0 | 0 | 0 | 0 | 0 |
| 0011 | 0 | 0 | 0 | 0 | 0 | 0 | 0 | 3 | 0 | 0 | 0 | 0 | 0 | 0 | 0 | 0 |
| 0100 | 0 | 0 | 0 | 0 | 0 | 0 | 0 | 0 | 0 | 0 | 0 | 0 | 0 | 0 | 0 | 0 |
| 0101 | 0 | 0 | 0 | 0 | 0 | 0 | 0 | 0 | 0 | 0 | 0 | 0 | 0 | 0 | 0 | 0 |
| 0110 | 0 | 0 | 0 | 0 | 0 | 0 | 0 | 3 | 0 | 0 | 0 | 0 | 0 | 0 | 0 | 0 |
| 0111 | 0 | 0 | 0 | 3 | 0 | 0 | 3 | 0 | 0 | 0 | 0 | 0 | 0 | 0 | 0 | 0 |
| 1000 | 0 | 0 | 0 | 0 | 0 | 0 | 0 | 0 | 0 | 0 | 0 | 0 | 0 | 0 | 0 | 0 |
| 1001 | 0 | 0 | 0 | 0 | 0 | 0 | 0 | 0 | 0 | 0 | 0 | 0 | 0 | 3 | 0 | 0 |
| 1010 | 0 | 0 | 0 | 0 | 0 | 0 | 0 | 0 | 0 | 0 | 0 | 0 | 0 | 0 | 0 | 0 |
| 1011 | 0 | 0 | 0 | 0 | 0 | 0 | 0 | 0 | 0 | 0 | 0 | 0 | 0 | 0 | 0 | 0 |
| 1100 | 0 | 0 | 0 | 0 | 0 | 0 | 0 | 0 | 0 | 0 | 0 | 0 | 0 | 3 | 0 | 0 |
| 1101 | 0 | 0 | 0 | 0 | 0 | 0 | 0 | 0 | 0 | 3 | 0 | 0 | 3 | 0 | 0 | 0 |
| 1110 | 0 | 0 | 0 | 0 | 0 | 0 | 0 | 0 | 0 | 0 | 0 | 0 | 0 | 0 | 0 | 0 |
| 1111 | 0 | 0 | 0 | 0 | 0 | 0 | 0 | 0 | 0 | 0 | 0 | 0 | 0 | 0 | 0 | 0 |

FIG. 14

REAL TIME CHARACTER THINNING SYSTEM

CROSS-REFERENCE TO RELATED APPLICATIONS

The present invention is related to copending applications, Ser. No. 532,255, filed on Sept. 15, 1983, abandoned, and its continuation-in-part application, Ser. No. 581,519, filed on Feb. 21, 1984, now U.S. Pat. No. 4,539,704, both in the name of José Pastor and both entitled Image Thinning Process, the disclosures of which are incorporated herein by reference.

BACKGROUND OF THE INVENTION

The present invention relates to image preprocessing, and more particularly to a system for real time character thinning.

Typically, after a character is scanned and the features to be analyzed are detected, the detected image (characters for an OCR machine) is compared with a mask stored in memory for recognition. If there is sufficient correspondence between the detected image and the mask, the character is recognized. However, it has long been recognized as desirable to find the skeleton of an image during image preprocessing to facilitate computer interpretation of images in optical character recognition and robotic systems. Present thinning techniques first require detection and isolation of the entire character prior to thinning. See, for example, U.S. Pat. No. 3,846,754, issued to Oka et al. on Nov. 5, 1974; U.S. Pat. No. 3,940,737, issued to Beun on Feb. 24, 1976; U.S. Pat. No. 3,975,709, issued to Beun et al. on Aug. 17, 1976; U.S. Pat. No. 4,034,344, issued to Savaga et al. on July 5, 1977; U.S. Pat. No. 4,115,760 issued to Ito on Sept. 19, 1978; and U.S. Pat. No. 4,162,482, issued to Su on July 24, 1979. Thereafter, complicated computations are performed on the detected image including finding edge gradients, chordal distances, etc. to find the skeleton of the image. With such techniques, one of the advantages of thinning, i.e., helping with line finding and the segmentation of lines into characters, is not used.

U.S. Pat. No. 3,339,1979 issued to Shelton, Jr., et al. on Aug. 29, 1967 discloses an image thinning technique based on eliminating all the pixels not necessary for connectivity. Specifically, a pattern is obtained by iteratively operating on the pattern to be identified with an incidence matrix. The result of operating on the input pattern by the incidence matrix is to generate an output pattern having a ridge of relatively high values along the center and lower values on either side of the ridge. Intersection points and end points are also determinable by the relative amplitudes of the values along the ridges. Such a thinning technique is not deterministic or universally applicable, but requires adjustments in the preservation values for different characters, e.g., by adjusting a potentiometer.

SUMMARY OF THE INVENTION

It is an object of the present invention to provide a real time character thinning system.

It is a further object of the present invention to provide a real time system for character thinning at video rates.

It is a further object of the present invention to provide a real time system for character thinning which is simple and economical to implement.

It is a further object of the present invention to provide a real time system for character thinning which maximizes throughput.

Briefly, in accordance with the present invention, a video output signal representing a thinned image is provided from digitized video input signals representing discrete picture elements (pixels) of a scanned image, comprising convolver means for identifying those pixels which are to be retained as part of the thinned image, those pixels which are to be discharged, and contingent pixels which may be part of the thinned image, and matrix filter means electrically coupled to the convolver means for determining which of the contingent pixels are to be discarded and which of the contingent pixels are to be retained as part of the video output signal representing a thinned image.

Other objects, aspects and advantages of the present invention will be apparent from the detailed description considered in conjunction with the drawings, as follows:

BRIEF DESCRIPTION OF THE DRAWINGS

FIG. 10 is a representation of a double-entry table or PROM matrix for the matrix filter circuits of FIGS. 3, 4, 7, 8 and 17;

FIG. 11 is a representation of a double-entry table or PROM matrix for use in the matrix filter circuit of FIG. 9;

FIG. 12 is a representation of another double-entry table or PROM matrix for use in the matrix filter circuit of FIG. 9;

FIG. 13 is a representation of another double-entry table or PROM matrix for use in the matrix filter circuit of FIG. 9;

FIG. 14 is a representation of another double-entry table or PROM matrix for use in the matrix filter circuit of FIG. 9;

DETAILED DESCRIPTION

Figure 1:
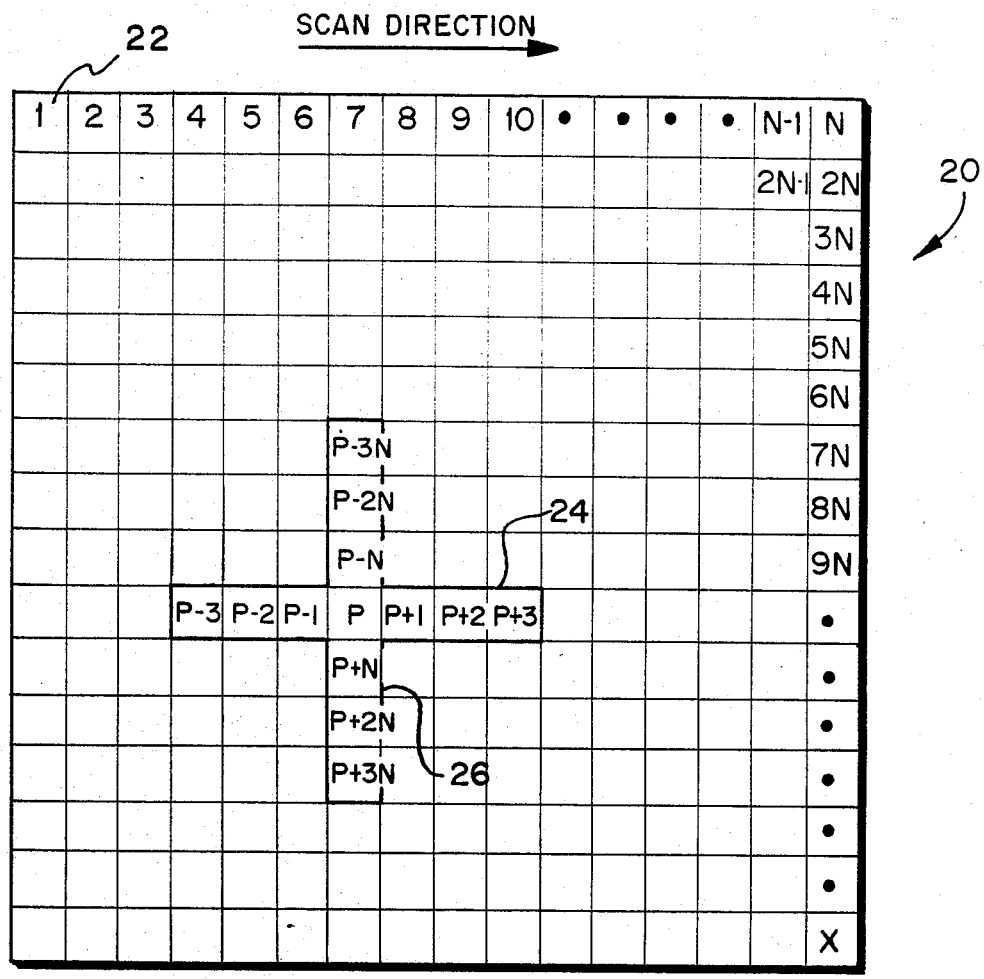
FIG. 1 is a location map for identifying the pixels of a digitized image.

Before discussing the apparatus of the present invention in detail, it is believed helpful to consider briefly the disclosure of related copending application, entitled, Image Thinning Process. In the copending related patent application, the convolution of vertical and horizontal pixel strings and the assignment of a weighting function thereto is discussed in detail. Further, it is pointed out therein that the coefficients of the weighting function can be selected as powers of 2 to facilitate digital electronics implementation. Applying the weighted convolution to each pixel string in the vertical and horizontal directions locates the center pixel of each string which is to be preserved as part of the thinned image or skeleton. Predetermined descriptors define the pixels which are to be preserved; such descriptors include the center pixels of isolated strings as well as adjacent pixel strings separated by one or two pixels for a 3 by 3 convolution. Additionally, pixels which are not to be preserved and contingent pixels which may be preserved are identified.

The information resulting from the weighted convolutions is applied to a matrix filter which saves certain of the contingent pixels for the thinned image in accordance with a matrix constructed from a neighborhood of pixels surrounding each contingent pixel. The neighborhood is empirically determined to eliminate pixels not belonging to the skeleton of the original image and to avoid producing breaks or holes in the thinned image. Advantageously, the matrix filter may be applied a plurality of times, eliminating contingent pixels from the skeleton with each application. Alternatively, a plurality of different parallel matrix filters may be utilized to immediately filter each pixel once in accordance with its value and the values of the pixels in its 3×3 neighborhood, thereby increasing the speed of the thinning process. As desired, additional weighted convolutions may be performed on the thinned image with subsequent filtering. However, if a new convolution is to be applied after filtering, all of the non-zero pixels are first made 1 to effectively represent the new working binary image.

For an N×N weighted convolution (N up, N down, N left and N right), the center descriptors to be preserved for odd and even pixel strings are derived as follows:

For strings of odd numbers of pixels having a length, $L=2j+1$, where $j=0 \ldots (N-1)$
Preserve descriptors $D_1, \ldots D_{2j+1}$, where:

$$D_1 (j = 0) = 1 + 2p + 2^{N+j+2}q$$

$$p = 0,1,2 \ldots (2^{N-j-1} - 1)$$

$$j' = j \text{ to } N - 1$$

$$q = 0,1,2 \ldots (2^{N-j'-1} - 1)$$

$$j'' = j \text{ to } N - 1$$

$$D_{2j+1} (j > 0) = 1 + \sum_{i=-(j-1)}^{i=j} 2^{N+i} + 2p + 2^{N+j+2}q$$

$$p = 0,1,2 \ldots (2^{N-j-1} - 1)$$

$$j' = j \text{ to } (N-1)$$

$$q = 0,1,2 \ldots (2^{N-j''-1} - 1)$$

$$j'' = j \text{ to } (N - 1)$$

For even strings having a length, $L=2k$, where $k=1, 2 \ldots N$ $$D_k \text{ Right} = 1 + \sum_{i=-(k-1)}^{i=k+1} 2^{N+i} + 2p + (2^{N+k+1}q)$$

$$p = 0,1,2 \ldots (2^{N-k'-1} - 1)$$

$$k' = k \text{ to } (N - 1)$$

$$q = 0,1,2 \ldots (2^{N-k''} - 1)$$

$$k'' = k \text{ to } N$$

$$D_k \text{ Left} = 1 + \sum_{i=-(k-2)}^{i=k} 2^{N+i} + 2p + 2^{N+k+2}q$$

$$p = 0,1,2 \ldots 2^{N-k'} - 1$$

$$k' = k \text{ to } N$$

$$q = 0,1,2 \ldots (2^{N-k''-1} - 1)$$

$$k'' = k \text{ to } (N - 1)$$

Thus, the total numbers to be preserved are:

$$T = (\text{all } \#j = 0) + \text{all } (\#j > 0) + \begin{array}{l}(\text{all } D_k \text{ Right}) \\ \text{or} \\ (\text{all } D_k \text{ Left})\end{array}$$

For a 3×3 weighted convolution, the descriptors for Right sided thinning, in accordance with the aforementioned equations are: 1, 3, 5, 7, 9, 11, 25, 27, 29, 33, 35 37, 39, 41, 43, 61, 63, 65, 67, 69, 71, 73, 75, 89, 91, 93, 97, 99, 101, 103, 105, 107 and 127.

That is the total number of descriptors $TD = 2^{2N-1} + 1$

For N=3

TD=33

Empirically, it has been found that in some instances breaks result in the thinned character. To avoid this, even pixel strings of two (2) pixels are preserved without thinning. To accomplish this, the descriptors for horizontal and vertical convolutions are modified so that the center descriptors for the right sided thinning are retained and the center descriptors for the 2 pixel strings of the left sided thinning are added thereto so that the descriptors are as follows: 1, 3, 5, 7, 9, 11, 17, 19, 21, 23 , 25, 27, 29, 33, 35, 37, 39, 41, 43, 57, 59 , 61, 63, 65, 67, 69, 71, 73, 75, 81, 83, 85, 87 , 89, 91, 93, 97, 99, 101, 103, 105, 107, 125 , and 127. Those descriptors added to preserve pixel strings having two pixels are indicated above in boxes.

In those instances where the convolution is a rectangle M×N, where M≠N, for example, a 3×2 convolution, the horizontal descriptors are as previously described and the vertical descriptors are: 1, 3, 5, 9, 11, 15, 17, 19, 21, 29, and 31.

Finally, as discussed in the copending related patent application, for further thinning, an anorexic filter may be applied to the thinned image to eliminate double line connections or overlapping lines.

Referring to FIG. 1, a pixel location map is illustrated as 20 with scanning proceeding from left to right in the direction of the arrow. A CCD array or other conventional scanner scans the image, e.g., alphanumeric characters on a page, zip codes and the like, beginning with the first element of the array which defines the first pixel 22, e.g., having the dimensions of a square 13 microns wide, and continues from left to right scanning each successive pixel as the document carrying the image moves past the CCD array. There are N columns of pixels and X rows of pixels in accordance with the number of elements N in the array and the number of scans X made by the array. However, it should be understood that the scanning can be accomplished in any direction, and the numbers of elements in the array as well as the number of scans can vary, as desired.

To effectively perform a 3×3 convolution in real time on an area of interest (pixel string) in the horizontal direction designated as 24 and in the vertical direction designated as 26 in FIG. 1, with pixel P at the center of the pixel strings, the pixels in the horizontal direction, i.e., P−3, P−2, P−1, P, P+1, P+2, and P+3, must be considered together and the pixels in the vertical direction, i.e., P−3N, P−2N, P−N, P, P+N, P+2N, and P+3N must be considered together.

Figure 2:
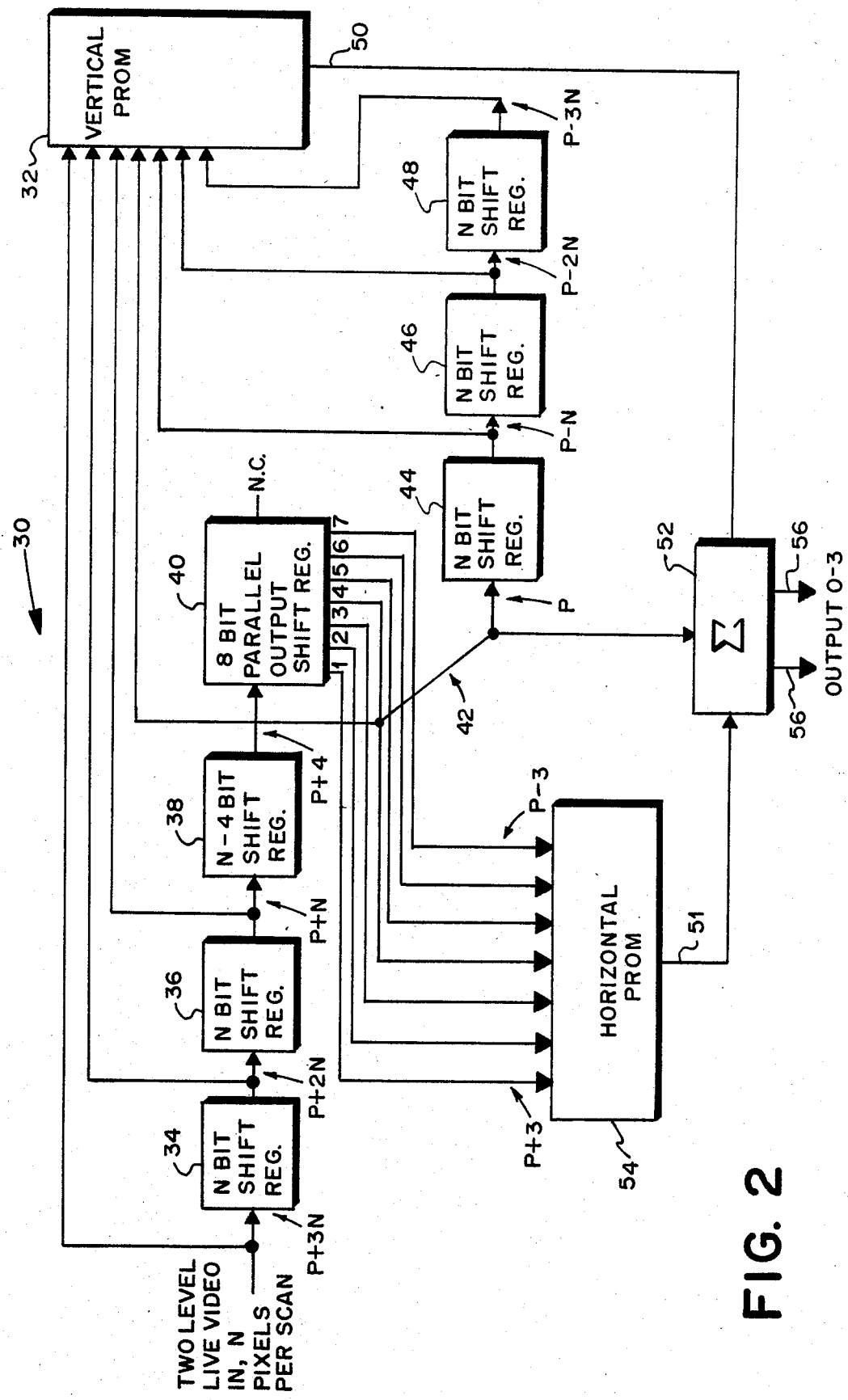
FIG. 2 is a block diagram of a convolver circuit in accordance with the present invention.

Advantageously, to accomplish this in real-time, a convolver circuit 30 is employed as illustrated in FIG. 2. The convolver circuit 30 includes a plurality of shift registers for storing and delaying the video input signal by N pixels. Specifically, considering first the vertical area 26 in FIG. 1, at the time the pixel P+3N is applied to a vertical PROM 32, an N bit shift register 34 provides the pixel P+2N at its output which pixel is also applied to the vertical PROM 32. Simultaneously, another N bit shift register 36, which is electrically coupled to the N bit shift register 34, provides the pixel P+N at its output which is also applied to the vertical PROM 32. An N−4 bit shift register 38 is electrically coupled to the N bit shift register 36 to provide the pixel P+4 at its output. Electrically coupled to the output of the N−4 bit shift register 38 is an 8 bit parallel output shift register 40. One output terminal 42 of the 8 bit parallel output shift register 40 provides the pixel P. The output terminal 42 is also applied to the vertical PROM 32. Also electrically coupled to the output terminal 42 of the 8 bit parallel output shift register 40 is another N bit shift register 44 which provides the pixel P−N at its output, which is also applied to the vertical PROM 32. Coupled to the output of the N bit shift register 44 is another N bit shift register 46 which provides the pixel P−2N at its output, which is also connected to the vertical PROM 32. Coupled to the output of the N bit shift register 46 is a final N bit shift register 48 which provides the pixel P−3N at its output which is also electrically connected to the vertical PROM 32. Thus, all of the vertical pixels of interest, i.e., P+3N, P+2N, P+N, P, P−N, P−2N, and P−3N, will arrive simultaneously at the vertical PROM 32.

The vertical PROM 32 is programmed with 1's for the center descriptors of the vertical convolution, as previously discussed, and 0's elsewhere. If the seven bit number representing the pixels P+3N, P+2N, P+N, P, P−N, P−2N and P−3N, or any combination thereof, represents a center descriptor, the vertical PROM 32 provides a high (1) output at its output terminal 50 which is electrically coupled to one input of an adder chip 52. If the seven bit number does not represent a center descriptor, a low (0) output is applied to the adder chip 52. The pixel or bit P is also supplied as a second input to the adder chip 52.

The third input to the adder chip 52 is provided from a horizontal PROM 54. The horizontal PROM 54 is programmed with 1's for the center descriptors of the horizontal convolution, as previously described, and 0's elsewhere. The horizontal PROM 54 receives seven inputs from the 8 bit parallel output shift register 40, representing the pixels P+3, P+2, P+1, P, P−1, P−2 and P−3. If the seven bit number representing these pixels, or any combination thereof, represents a center descriptor, the horizontal PROM 54 provides a high (1) output at its output terminal 51 which is electrically coupled to the third input to the adder chip 52.

The adder chip 52 adds the output signal from the vertical PROM 50, the output signal from the horizontal PROM 54 and the output signal for the pixel in question P, the central pixel. The resulting output present at the output terminals 56 of the adder chip 52 will have a value between 0 and 3. Zero if all inputs to the adder chip 52 are 0; one if only one of the inputs to the adder chip 52 is one; two if only two of the inputs to the adder chip 52 are one; and three if all three of the inputs to the adder chip 52 are one. Pixels which result in a zero output (00) at the output terminals 56 of the adder chip 52 are discarded. Pixels which provide a 3 output (11) at the output terminals 56 of the adder chip 52 are preserved. Pixels which provide a 1 output (01) or a 2 output (10) at the output terminals 56 of the adder chip 52 are contingent pixels which may or may not be preserved in accordance with the matrix filter circuit 60 of FIG. 3.

Figure 3:
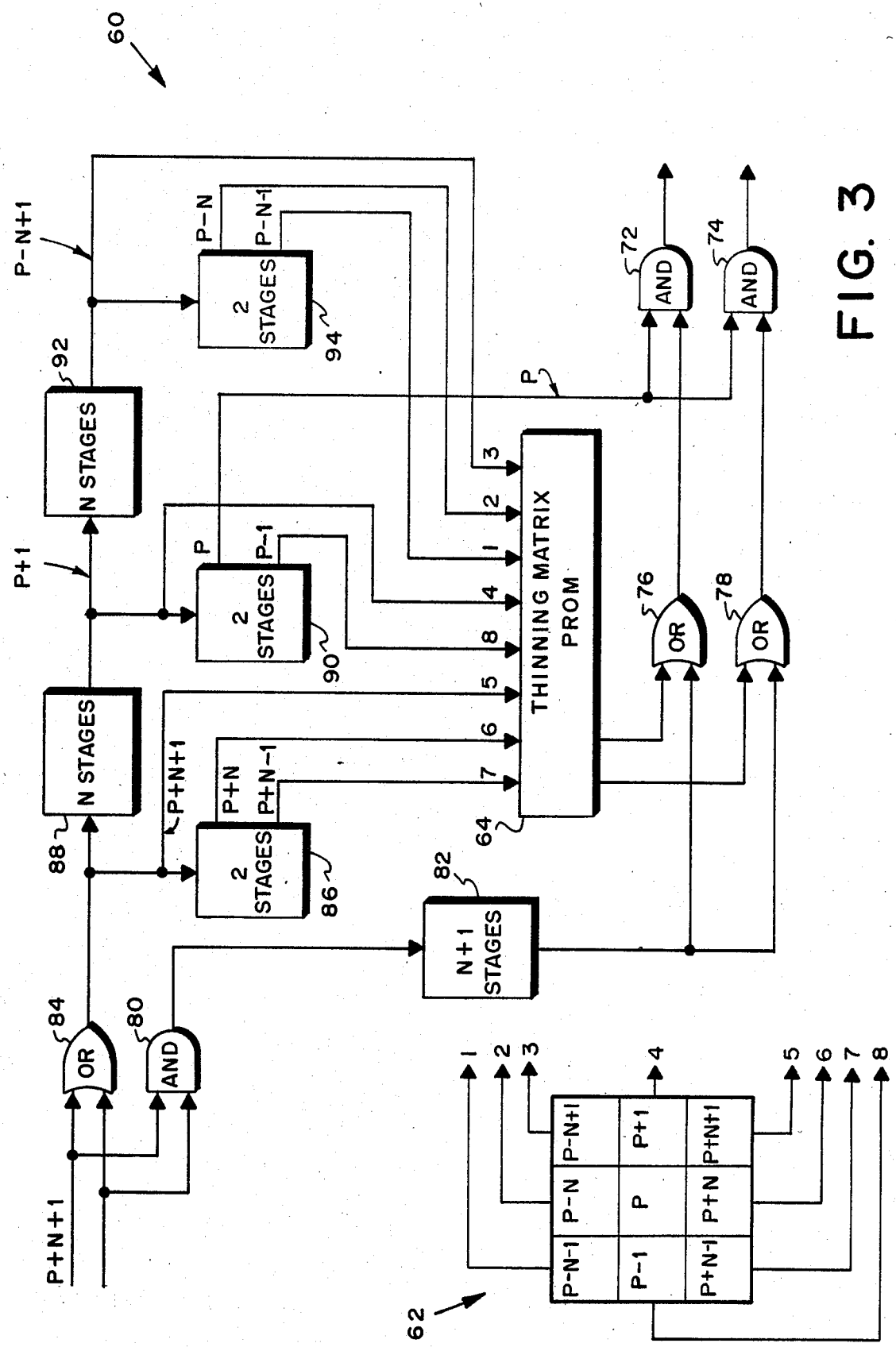
FIG. 3 is a block diagram of a matrix filter circuit in accordance with the present invention.
Figure 4A:
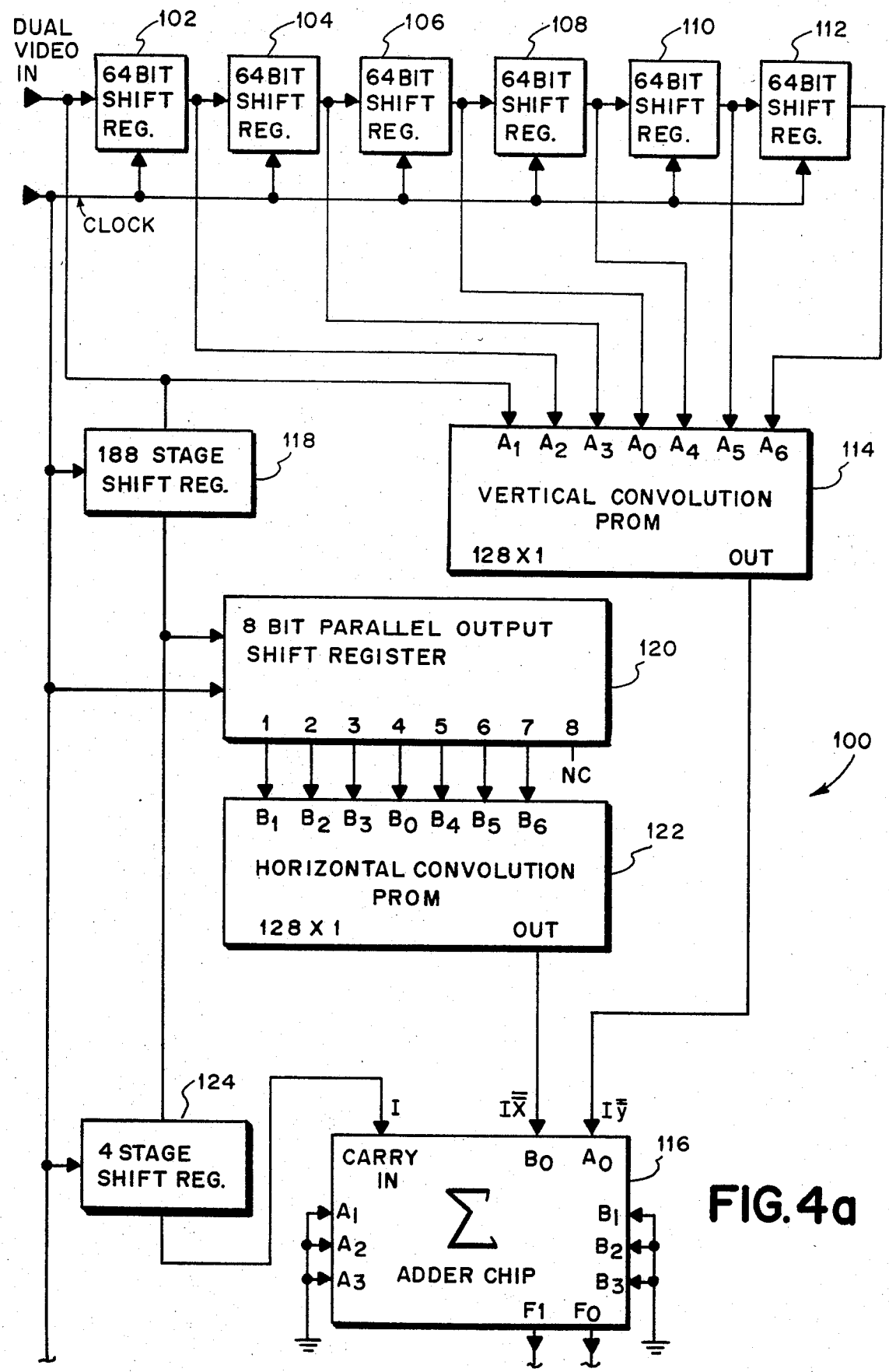
Figure 4B:
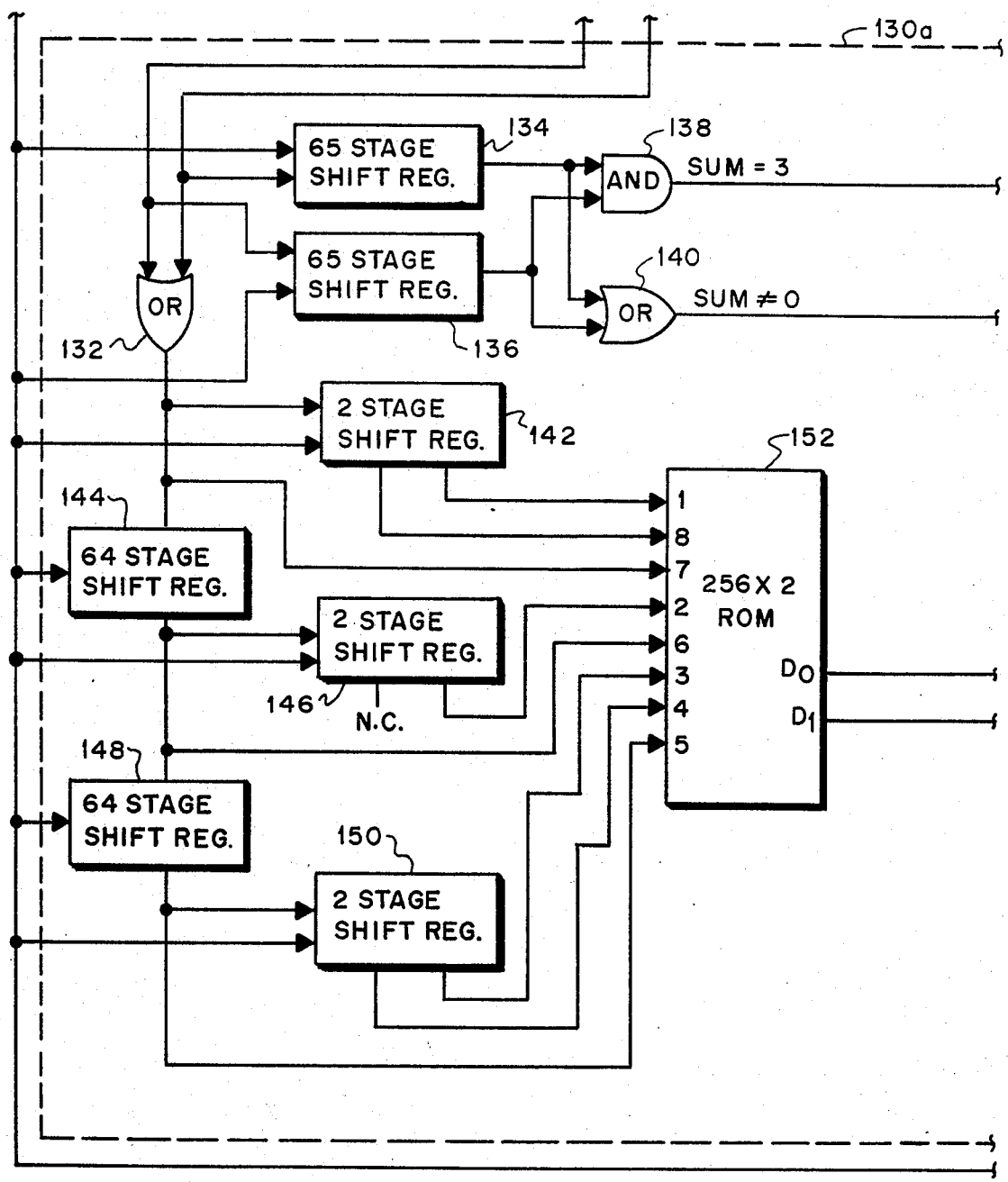
Figure 4C:
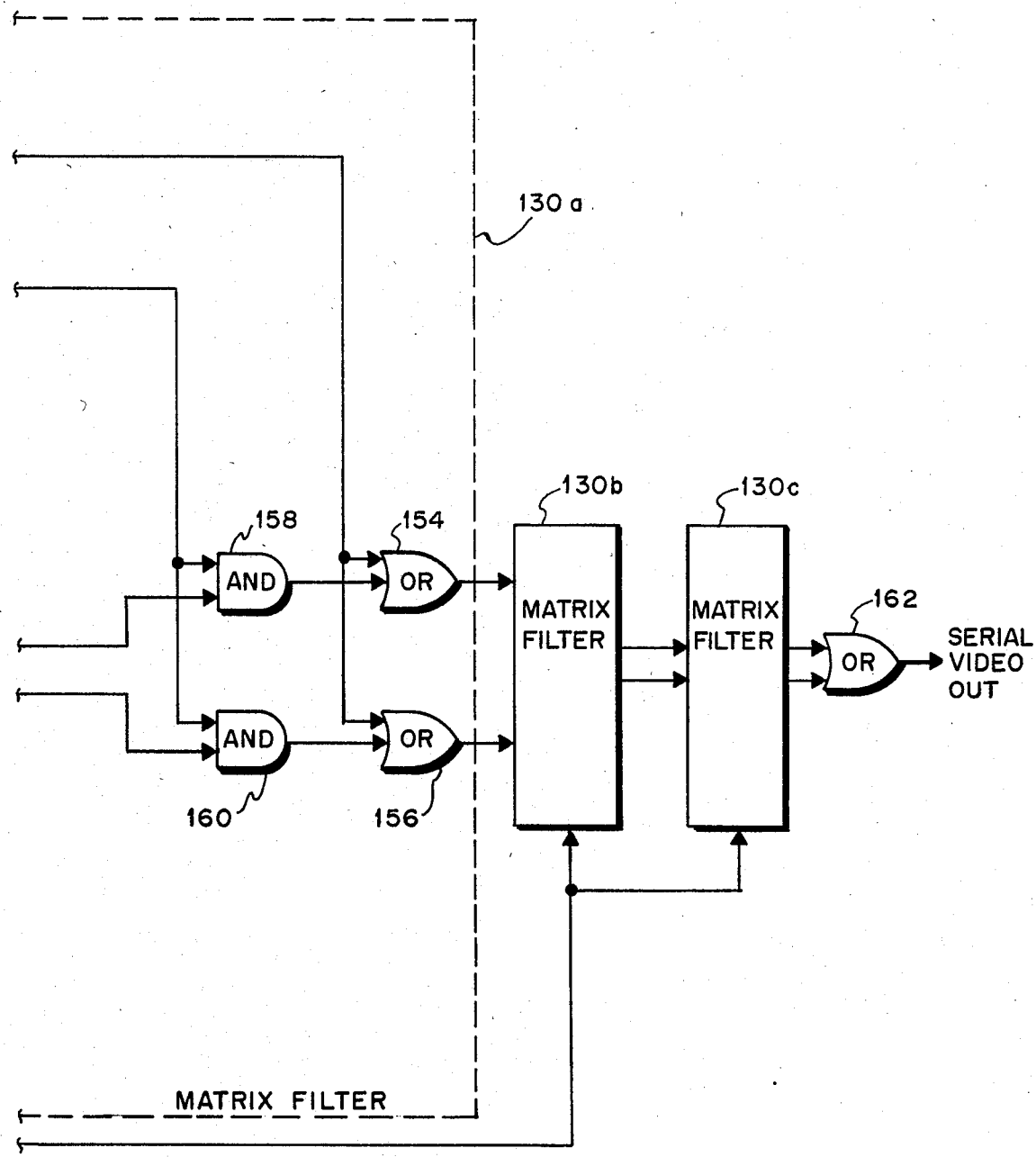

Referring to FIG. 3, to determine whether the pixel, P is to be preserved, its neighborhood 62 of pixels P−N−1, P−N, P−N+1, P−1, P+1, P+N−1, P+N, and P+N+1 is compared with a double-entry table stored in a thinning matrix PROM 64. The double-entry table 70 which is programmed into the thinning matrix PROM 64 is shown in FIG. 10.

The double-entry table 70 is formed from two four bit values or nibbles of the neighborhood 62 surrounding each pixel having a value 1 or 2. In accordance with the thinning matrix PROM 64, pixels from the output of the convolver circuit 30 having a value of 1 or 2 are converted to 0, 2, or 3; 0's are discarded, 3's are preserved and 2's are contingent.

Pixels that are 0 at the output of the convolver circuit 30 represent a blank area of the image and must remain 0. Thus, 0's supplied to the matrix filter circuit 60 must remain zeros. This is accomplished by AND gates 72 and 74. Similarly, if the output of the convolver circuit 30 is a 3, it must remain a 3. This is accomplished by the OR gates 76 and 78 which provide one input to AND gates 72 and 74, respectively. When the output of the convolver circuit 30 for a given pixel is a 3, both inputs to AND gate 80 are high (11) providing a high signal at its output. This signal is applied to an N+1 bit shift register 82, which delays the signal to match the delay introduced by the remainder of the matrix filter circuit 60. The output of the N+1 bit shift register 82 provides one input to each of the OR gates 76 and 78.

Pixel outputs from the convolver circuit 30 having a value of 1 (01) or 2 (10) are contingent pixels. As previously mentioned, in determining whether to preserve them, the neighborhood 62 of surrounding pixels is analyzed. This neighborhood is obtained as follows: When the last pixel of the neighborhood, here P+N+1, is applied to an OR gate 84, the OR gate 84 produces a high output which is applied to a two bit parallel output shift register 86 and an N bit shift register 88. The input to the two bit parallel output shift register 86 is applied to the thinning matrix PROM 64 as are the two outputs from the two bit parallel output shift register 86. The output from the N bit shift register 88 is coupled directly to the PROM 64 to supply another input thereto and to a 2 bit parallel output shift register 90 which supplies another input to the PROM 64, and one input to the AND gates 72 and 74. The output of the N bit shift register 88 is also coupled to the N bit shift register 92. The N bit shift register 92 has its output coupled directly to the PROM 64 and to a 2 bit parallel output shift register 94 which supplies two inputs to the PROM 64.

That is, when pixel P+N+1 is present at the input of the OR gate 84 in the form of a binary 0, 1, 2 or 3 (00, 01, 10, or 11), the inputs to the PROM 64 are P+N+1, P+N, P+N−1, P−1, P−N−1, P−N, P−N+1, and P+1. In accordance with the table of values in FIG. 10, which are incorporated into the PROM 64, the output from PROM is 0(00), 2(10) or 3(11), which is supplied to the OR gates 76 and 78. If the output from the PROM is zero (00), the output from the OR gates 76 and 78 is zero and, therefore, the output from AND gates 72 and 74 is zero (00) unless the output of the N+1 bit shift register 82 is high. If the output from the AND gate 80 was high N+1 pixels ago, the output of the N+1 bit shift register 82 is high in the form of pixel P. This results in the high signal, P, present at the other inputs of the OR gates 76 and 78. Thus, a high output is supplied to the AND gates 72 and 74. Since the other input signal to the AND gates 72 and 74 is also P, the output of the AND gates 72 and 74 is high or 3(11).

If the pixel P has a value of 1 or 2, the AND gates 72 and 74 will provide a high or low output in accordance with the PROM 64. If the pixel P has a zero value, the output of the AND gates 72 and 74 is zero (00). As previously discussed, if the pixel is a 3 the output from the N+1 bit shift register 82 will control the outputs of the OR gates 76 and 78.

Specifically, if the pixel P+N+1 has a value of 1 or 2 the output of the AND gate 80 is low (0) and the output of the N+1 bit shift register 82 for pixel P is zero. Thus, the output of the PROM 64 controls the output of the OR gates 76 and 78. If the output of the PROM 64 is zero (00), the output of the AND gates 72 and 74 will be zero unless the pixel P was a 3(11). If the output of the PROM 64 is 2 (10), the output of AND gate 72 is high and the output of AND gate 74 is low, resulting in (10). If the output of the PROM 64 IS 3(11), the outputs of both AND gates 72 and 74 are high or (11).

Advantageously, the output of the convolver current 30 is applied to a plurality of filter matrices 60, preferably three, connected in series, with each filter matrix 60 eliminating more of the contingent pixels. Finally, the two output bits from the last matrix filter 60 are applied to an OR gate, see FIG. 4, to produce a two level video output signal which represents a thinned image of the two level video input signal. As desired, the thinned two level video output signal may be applied to a digital display device or an OCR system, which may include image masks.

Figure 4:
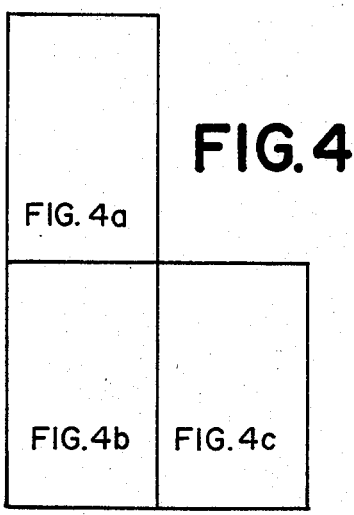
FIG. 4 (FIGS. 4a–4c), is a block diagram of a character thinning system in accordance with the present invention utilizing a 64 element scanning array and three matrix filters.

Referring to FIG. 4, a system in accordance with the present invention is illustrated generally at 100. This system assumes a scanning array length of 64 elements or photodiodes to digitize the image into 64 horizontal pixels. A conventional clock (not shown) supplies timing pulses for the system 100. The digitized input video signal representing the pixels is supplied to the system 100 from the scanning array (not shown). Six 64 bit shift registers 102, 104, 106, 108, 110 and 112 supply the horizontal pixel inputs to a vertical convolution PROM 114. It is apparent that if a 64 element array is utilized for the scanning, the six 64 bit shift registers 102–112 will provide the proper delay in the pixel input so that signals $A_1$, $A_2$, $A_3$, $A_0$, $A_4$, $A_5$, and $A_6$, each 64 bits apart, will arrive simultaneously at the PROM 114. The output from the vertical PROM 114 provides one of the inputs to an adder chip 116.

The input video signal and the clock signal are also applied to a 188 bit shift register 118. The output of the shift register 118 and the clock are applied to an 8 bit parallel output shift register 120. By first shifting the input video signal by 188 pixels the pixel $B_7$ is provided. That is, to obtain the pixels $B_1$ through $B_6$, starting with $A_1$, a shift of 3×64=192 bits will locate pixel $B_0$. To locate the first pixel adjacent the last pixel in the horizontal string $B_1$ through $B_6$, the shift of 192 bits is reduced by 4 bits, i.e., the shift is 188 bits. The output of the 188 bit parallel shift register 118 is applied to the 8 bit parallel output shift register 120 to provide bits $B_0$ through $B_6$ as the input is shifted 1 bit at each of the seven outputs (the last output is not connected).

The seven outputs $B_0$ through $B_6$ from the 8 bit parallel output shift register 120 are applied to the inputs of a horizontal convolution PROM 1–2 which supplies one input to the adder chip 116. Finally, the output from the shift register 118, along with the clock pulses, is applied to a 4 bit shift register 124 to provide the pixel output $B_0$. This output is also applied to the adder chip 116. The adder chip 116 provides the outputs 0(00), 1(01), 2(10) or 3(11) at its output terminals $F_1$ $F_0$ in response to the presence or absence of signals at its input terminals I, Iy and Ix.

The output pulses from the terminals $F_1$ and $F_0$ are applied to the matrix filter circuit indicated in dotted outline as 130A. Specifically, and OR gate 132 receives the pulses and provides an output pulse if either input is high, i.e., the output of the adder 116 is a 1, 2, or 3. One input to the OR gate 132 and the clock pulses are applied to a 65 bit shift register 134; the other input to the OR gate 132 and the clock pulses are applied to another 65 bit shift register 136. The outputs of the shifts registers 134 and 136 are applied to an AND gate 138 and an OR gate 140. The AND gate 138 provides a high output only when its inputs are high, which means an output of 3(11) from the adder chip 116. The OR gate 140 provides a high output if the output from the adder chip 116 is 1, 2, or 3. The result of the 65 stage shift registers 134 and 136 is to shift the pixel neighborhood 62 in FIG. 3 from the last pixel of the neighborhood to the pixel in question, i.e., $A_0$ or P.

The eight (8) pixels in the neighborhood 62 are provided as follows: The output from the OR gate 132 with the clock pulses is applied to a 2 bit parallel output shift register 142. The first output from the shift register 142 supplies the output for pixel 8 of the neighborhood 62. The second output from the shift register 142 provides the output for pixel 1 of the neighborhood 62.

The output from the OR gate 132, along with the clock pulses, is also applied to a 64 bit shift register 144, whose output is applied to a 2 bit parallel output shift register 146. One output of the shift register 146 is not connected. The other output of the shift register 146 provides the output for pixel 2 of the neighborhood 62.

The output from the OR gate 132 provides the output for pixel 7 of the neighborhood 62.

The output from the shift register 62 is applied to another 64 bit shift register 148, along with the clock pulses, to provide the output for the pixel 5 of the neighborhood 62. The output of the shift register 148 is supplied to a 2 bit parallel output shift register 150, which provides the outputs for the pixels 4 and 3 of the neighborhood 62. The outputs for the pixels 1 through 8 of the neighborhood are applied to the thinning PROM 152 which is programmed in accordance with the double-entry table 70 in FIG. 10. Pixels 5, 6, 7 and 8 provide the vertical digital entries and pixels 1, 2, 3 and 4 provide the horizontal digital entries. The outputs from the PROM 152 will be 0, 2 or 3 (00, 10 and 11) in accordance with the double-entry table 70 of FIG. 10.

If the output of the adder chip 116 is equal to 3(11), the outputs of OR gates 154 and 156 are high (11). If the output of the adder chip 116 is equal to zero (00), the outputs of OR gates 154 and 156 are low (00). However, if the output of the adder chip 116 is 1 or 2, the output of the OR gate 140 will be high. This high output is supplied to AND gates 158 and 160. Thus, if either of the other inputs to the AND gates 158 or 160 is high the output of that respective AND gate 158 or 160 will be high. This will occur if the value in the double-entry table 70 is a 2 (10) or 3 (11). Thus, a 10 or 11 output is provided by the OR gates 154 and 156. If the value in the double-entry table 70 is 0, both outputs from the PROM 152 are low causing AND gates 158 and 160 to go low. This results in a low signal (00) at the outputs of the OR gates 154 and 156. Additional matrix filters 130B and 130C may be connected in series with the matrix filter 130A as shown in FIG. 4 to provide further thinning by eliminating more of the contingent pixels. The resulting output is then applied to an OR gate 162 to provide a two level video output signal representing the thinned image.

Figure 5:
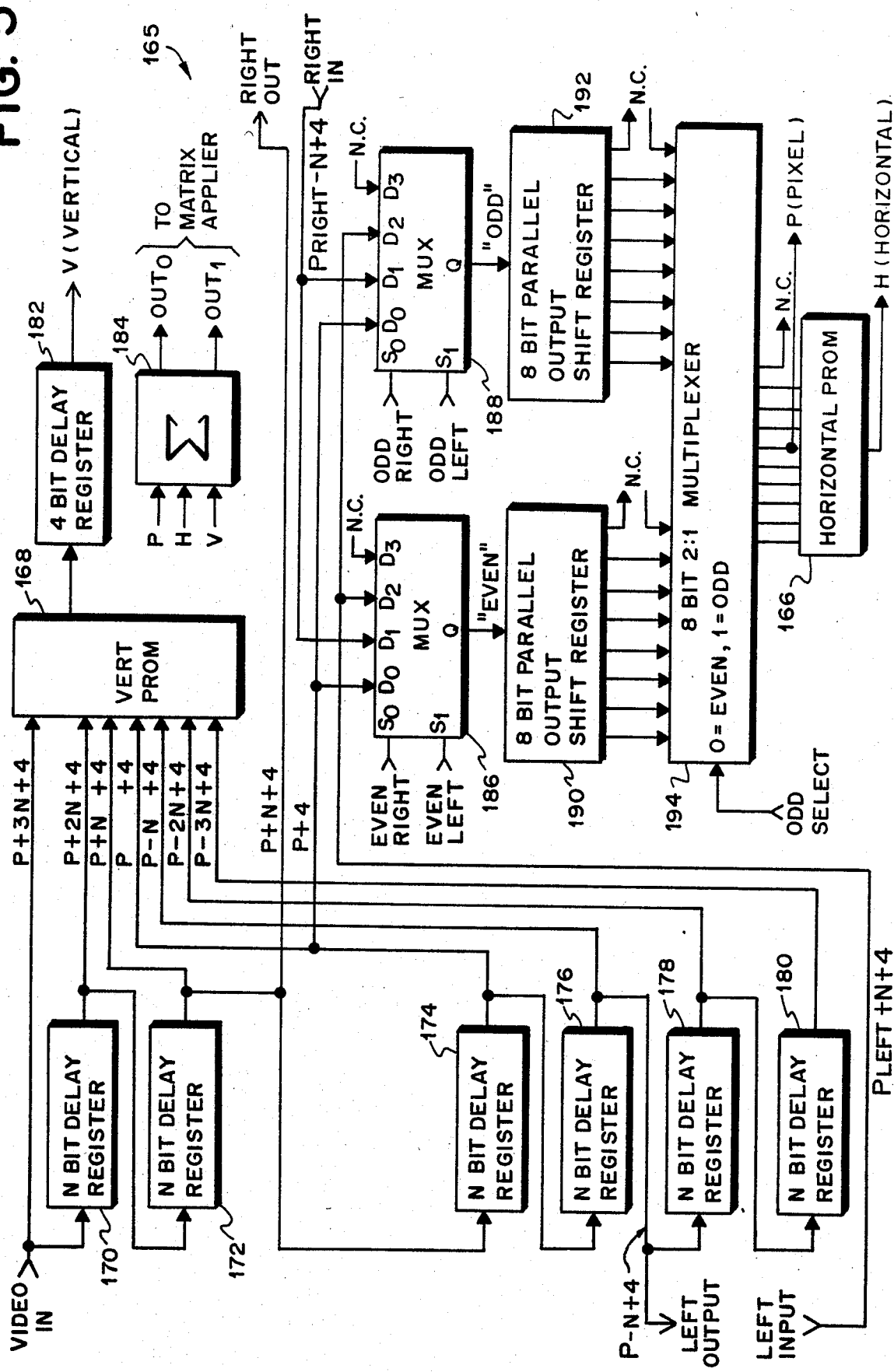
FIG. 5 is a block diagram of a convolver circuit with parallel interconnections for coupling to other convolvers to improve throughput.

To improve throughout, it may be desirable to utilize a plurality of parallel scanning arrays. Referring to FIG. 5, it is assumed that each array has a length of N elements or N pixels. A typical array length is 64 elements. However, at the borders between adjacent arrays, N pixel inputs from each adjacent array are utilized for the weighted convolutions so that when the scanning array starts a new line the introduction of inaccuracies due to the presence of the stored input data of the preceding line is elimated. To accomplish this, the convolver circuit designated 165 is utilized to determine when a pixel position is near the end of an array so that the appropriately delayed signal from an adjacent array can be substituted in the horizontal PROM 166. A vertical PROM 168 receives its inputs from the video input signal and from six N bit delay registers 170–180. Thus, as seen in FIG. 1 for the area of interst 26, the pixels P+3N+4, P+2N+4, P+N+4, P+4, P−N+4, P−2N+4, P−3N+4 will be supplied to the input of the vertical PROM 168. The output of the vertical PROM 168 is delayed 4 bits by register 182 and supplied as one input to an adder chip 184. The output from the register 172, pixel P+N+4, is provided as the right output to the RIGHT array. Also, the output from the register 176, pixel P−N+4 is provided as the left output to the LEFT array.

An input from the LEFT array, which is the right output signal from the LEFT array, is supplied as one input to a pair of 4 to 1 multiplexers 186 and 188. The multiplexers 186 and 188 also receive an input from the RIGHT array which is the left output signal from the RIGHT array. The final input to the multiplexers 186 and 188 is received from register 174 in the form of pixel P+4.

The output of the multiplexer 186 is applied to an 8 bit parallel output shift register 190 and the output of the multiplexer 188 is applied to an 8 bit parallel output shift register 192. The outputs of the shift registers 190 and 192 are applied to an 8 bit 2:1 multiplexer 194. The multiplexer 194 selects which shift register 190 or 192 will have its output applied to the horizontal PROM 166, threby facilitating the handling of alternate scan lines.

The output (H) from the horizontal PROM 166 is applied as one input to the adder 184. As previously discussed, output from the 4 bit delay register 182 provides another input to the adder 184. The final input (P) to the adder 184 is the pixel in question from the original image. The adder 184 combines the three inputs and provides an output of 0(00), 1(01), 2(10) or 3(11) which is applied to the matrix filter circuit 210 illustrated in FIG. 7.

The shift registers 190 and 192 provide the seven horizontal pixels for the area of interest to the multiplexer 194. The multiplexers 186 and 188 provide inputs to the shift registers 190 and 192, respectively, in response to logic signals derived from the pixel timing logic in FIG. 6. Moreover, the multiplexer 194 selects one of the registers 190 or 192 based on the absence or presence of the odd select logic signal also derived from the pixel timing logic. Further, it should be understood with regard to FIG. 5 that clock pulses are applied to all shift registers.

Figure 6:
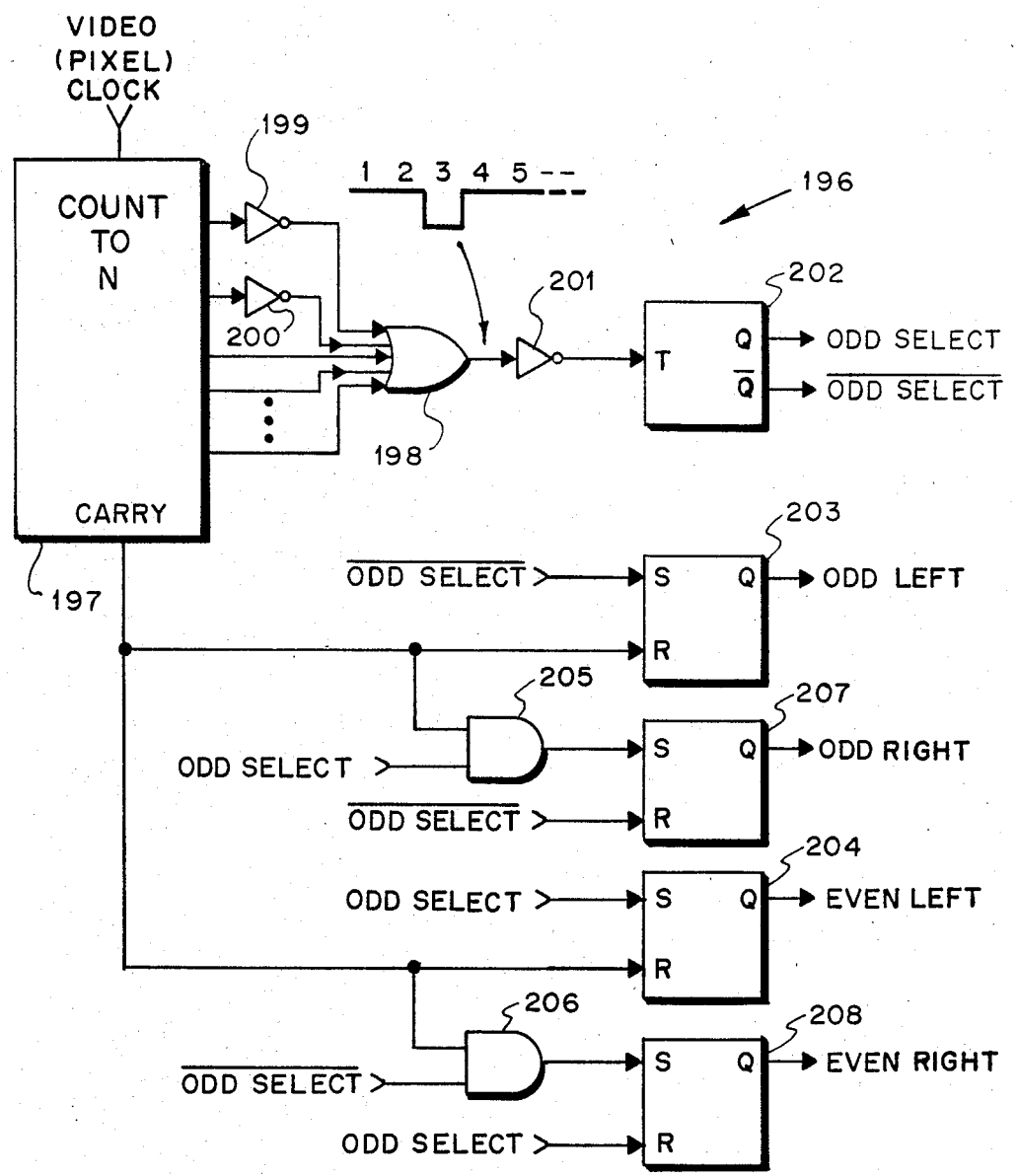
FIG. 6 is a block diagram of a timing circuit for use with the convolver circuit of FIG. 5.
Figure 7A:
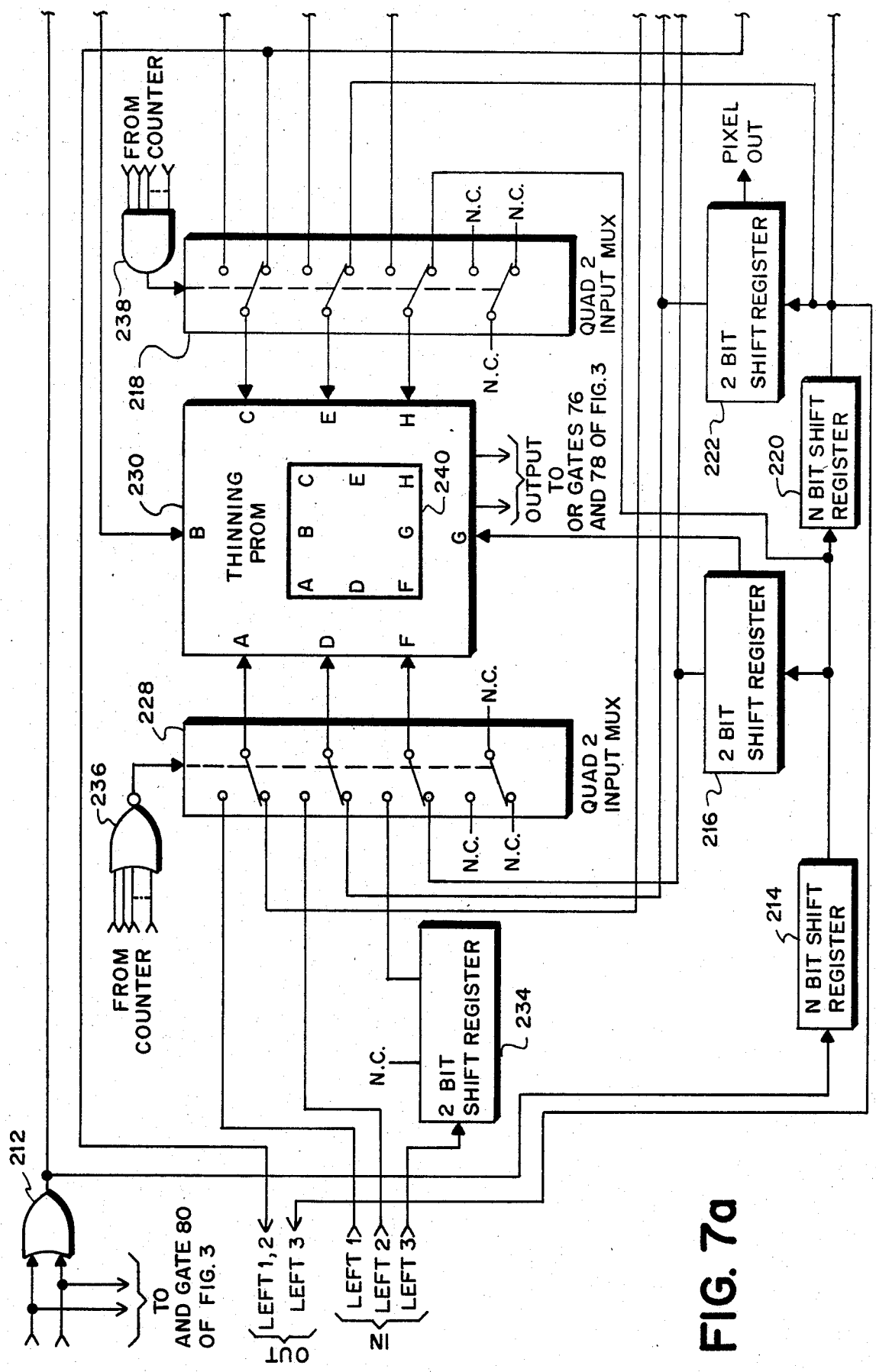

Referring to FIG. 6, a timing logic circuit for the convolver circuit 165 of FIG. 5 is designated as 196. The timing logic circuit 196 includes a counter 197 having the capability of counting to N, with N corresponding to the number of elements in an array, e.g., if N=64 the counter 197 will be a 6 bit counter. Clock pulses are received by the counter from the system clock (not shown) to count the pixel number or element in use in the array. The output from the counter 197 is applied to a 3rd pixel detector 198. The first two outputs from the counter 197 are inverted by inverters 199 and 200, respectively, before being applied to the 3rd pixel detector 198. Thus, the output of the detector 198 is one unless both of its first two outputs are low as a result of the inverting of two high outputs from the counter 197, whereupon the output is a negative going pulse as illustrated in FIG. 6 indicating the occurrence of pixel 3. The output of the detector 198 is inverted by inverter 201 and applied to a toggle flip-flop 202. The toggle flip-flop 202 toggles back and forth between an ODD SELECT output and inverted ODD SELECT output, ODD SELECT, in response to the presence or absence of the pixel 3 signal.

A counter overflow output or CARRY output is applied to the reset input of a set-reset flip-flop 203 and the reset input of a set-reset flip-flop 204. Additionally, the CARRY output is applied to one input of an AND gate 205 and one input of another AND gate 206. The AND gate 205 receives its other input from the ODD SELECT output of the toggle flip-flop 202. The AND gate 206 receives its other input from the ODD SELECT output of the toggle flip-flop 202. The output of the AND gate 205 is applied to the set terminal of a set-reset flip-flop 207. The output of the AND gate 206 is applied to the set terminal of a set-reset flip-flop 208.

The flip-flop 203 receives the ODD SELECT output from the flip-flop 202 at its set input. The flip-flop 207 receives the ODD SELECT output from the flip-flop 202 at its reset input. The flip-flop 204 receives the ODD SELECT output from the flip-flop 202 at its set input. The flip-flop 208 receives the ODD SELECT output from the flip-flop 202 at its reset input.

The ODD SELECT output signal from the flip-flop 202 is applied to the multiplexer 194 of FIG. 5. When the ODD SELECT signal is low, the multiplexer 194 selects the input from shift register 190 (even). When the ODD SELECT signal is high, the multiplexer 194 selects the input from the shift register 192 (odd). Further, in the presence of an ODD SELECT signal the flip-flop 204 is set to EVEN LEFT and the EVEN RIGHT signal from flip-flop 208 is reset. Thus, the EVEN LEFT input to the multiplexer 186 is activated causing the multiplexer 186 to apply the LEFT array pixel data to shift register 190 until flip-flop 204 is reset by the next counter CARRY signal. Further, in the presence of an ODD SELECT signal flip-flop 203 is set to provide an ODD LEFT output and the ODD RIGHT signal from flip-flop 207 is reset. Thus, the ODD LEFT input to the multiplexer 188 is activated causing the multiplexer 188 to apply the LEFT array pixel data to shift register 192 until flip-flop 203 is reset by the next counter CARRY signal.

When the CARRY output signal goes high, which occurs at pixel position 0, in the presence of a high ODD SELECT signal, the flip-flop 208 is set and the multiplexer 186 selects the RIGHT array input data by an EVEN RIGHT input until reset by ODD SELECT signal on the following scan line. Likewise in the presence of a CARRY output and a high ODD SELECT signal, the flip-flop 207 is set and the multiplexer 188 selects the RIGHT array input data by an ODD RIGHT input until reset by the ODD SELECT signal on the following scan line.

Figure 7:
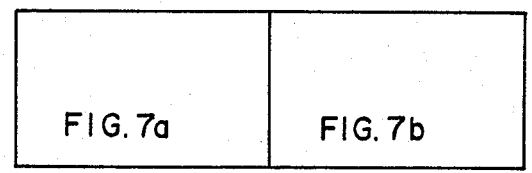
FIG. 7 (FIGS. 7a–7b), is a block diagram of a filter matrix circuit for use with the convolver circuit of FIG. 5.

Referring to FIG. 7, a matrix filter circuit 210 is illustrated therein. It is similar to the matrix filter circuit 60 of FIG. 3, but modified like FIG. 5 to accommodate pixels at the borders between adjacent arrays. An input pixel is received by OR gate 212 which provides a RIGHT 3 output to the RIGHT array and an input to N bit shift register 214. The output of the N bit shift register 214 is applied to a 2 bit parallel output shift register 216, to one input of a quad 2 input multiplexer 218, and to another N bit shift register 220. The output of the N bit shift register 220 is applied to a 2 bit parallel output shift register 222, to another input of the quad 2 input multiplexer 218, to another N bit shift register 224, and provides the LEFT 3 output to the LEFT array. The output of the N bit shift register 224 is applied to a 2 bit parallel output shift register 226 and to one input of the quad 2 input multiplexer 218. Further, this output provides the LEFT 1, 2 output to the LEFT array.

One output from the 2 bit parallel output shift register 216 provides a RIGHT 2 output to the RIGHT array and provides one input to a quad 2 input multiplexer 228. The other output of the 2 bit parallel output shift register 216 is applied to input terminal G of a thinning matrix PROM 230. One output from the 2 bit parallel output shift register 222 provides one input to the quad 2 input multiplexer 228 and provides the RIGHT 1 output to the right array. The other output of the 2 bit parallel output shift register 222 provides the output representing the pixel whose neighborhood is being examined. One output of the 2 bit parallel output shift register 226 provides one input to the quad 2 input multiplexer 228. The other output of the 2 bit parallel output shift register 226 is applied to terminal B of the thinning matrix PROM 230.

Additional inputs to the multiplexer 218 are provided from the RIGHT 3 input from the RIGHT array and the RIGHT 1, 2 inputs from the right array. Moreover, the input from the RIGHT 1, 2 input is also applied to an N bit shift register 232 whose output provides another input to the multiplexer 218.

Additional inputs to the multiplexer 228 are provided from the LEFT 1 input from the LEFT array and the LEFT 2 input from the LEFT array. The LEFT 3 input from the LEFT array is applied to a 2 bit parallel output shift register 234 whose output provides another input to the multiplexer 228.

A NOR gate 236 receives input signals from the output of the N bit counter 197 shown in FIG. 6 and provides a high or low output signal to the multiplexer 228 in accordance with the state of the input signals. Normally, the output of the NOR gate 236 will be low so that the output supplied from the multiplexer 228 to the terminals A, D and F of the PROM 230 is routed from the inputs of the multiplexer 228 as illustrated. However, if all the inputs to the NOR gate 236 are low (indicating the first bit or element in the array), the output of the NOR gate 236 is high causing the multiplexer 228 to switch its input to the last three bits or array elements of the LEFT array. These last three bits $(N-2)$, $(N-1)$ and $N$ are then applied to the terminals A, D and F of the PROM 230.

An AND gate 238 also receives input signals from the output of the N bit counter 197 shown in FIG. 6 and provides a high or low output signal to the multiplexer 218 in accordance with the state of the input signals. Normally, the output of the AND gate 238 will be low so that the output supplied from the multiplexer 218 to the terminals C, E and H of the PROM 230 is routed from the inputs of multiplexer 218 as illustrated. However, if the inputs to the AND gate 238 are all high (indicating the last bit or element in the array), the output of the AND gate 238 is high causing the multiplexer 218 to switch its input to the first three bits or array elements of the RIGHT array. These first three bits (0), (1) and (2) are then applied to the terminals C, E and H of the PROM 230. The output from the PROM 230 is applied to OR gates 76 and 78 as illustrated and described with reference to FIG. 3.

Thus, in accordance with the foregoing it is apparent that at the beginning of a line of elements for a central array the last three pixels of the LEFT array and the first three pixels of the RIGHT array are utilized for the pixel neighborhood 240 of FIG. 7.

Figure 8:
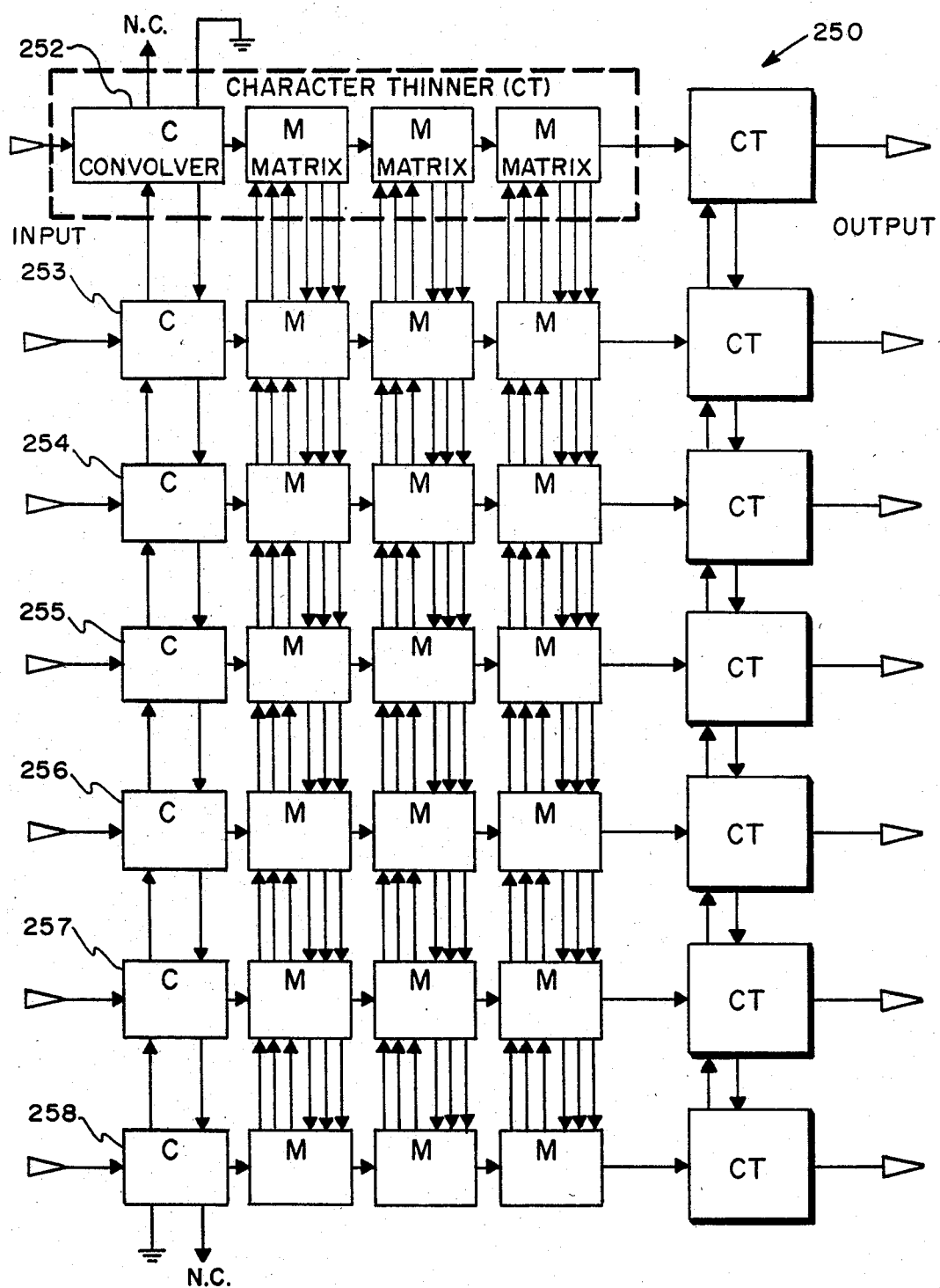
FIG. 8 is a block diagram showing the interconnections between a plurality of convolver circuits and matrix filter circuits to improve throughput.
Figure 9A:
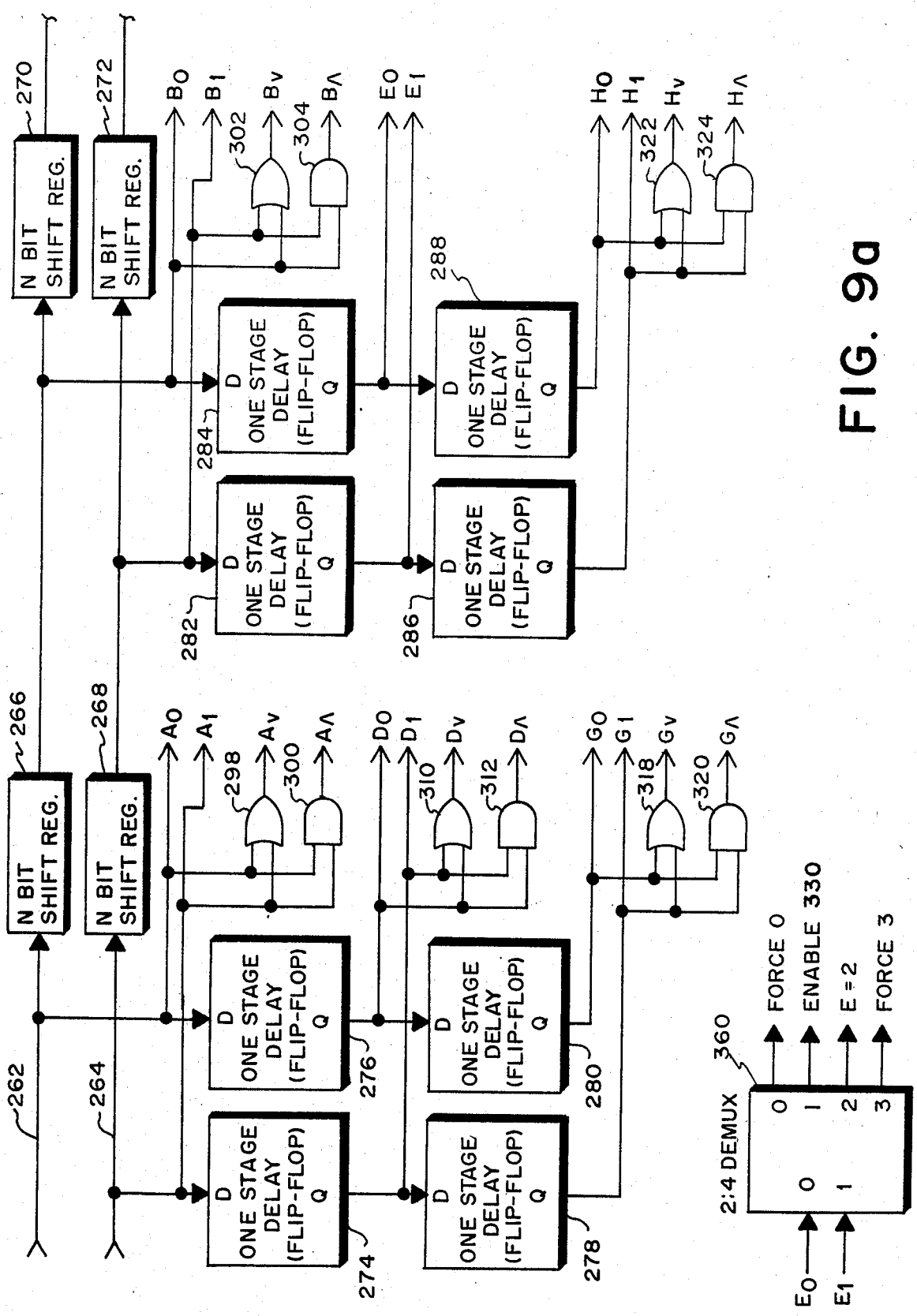
Figure 9B:
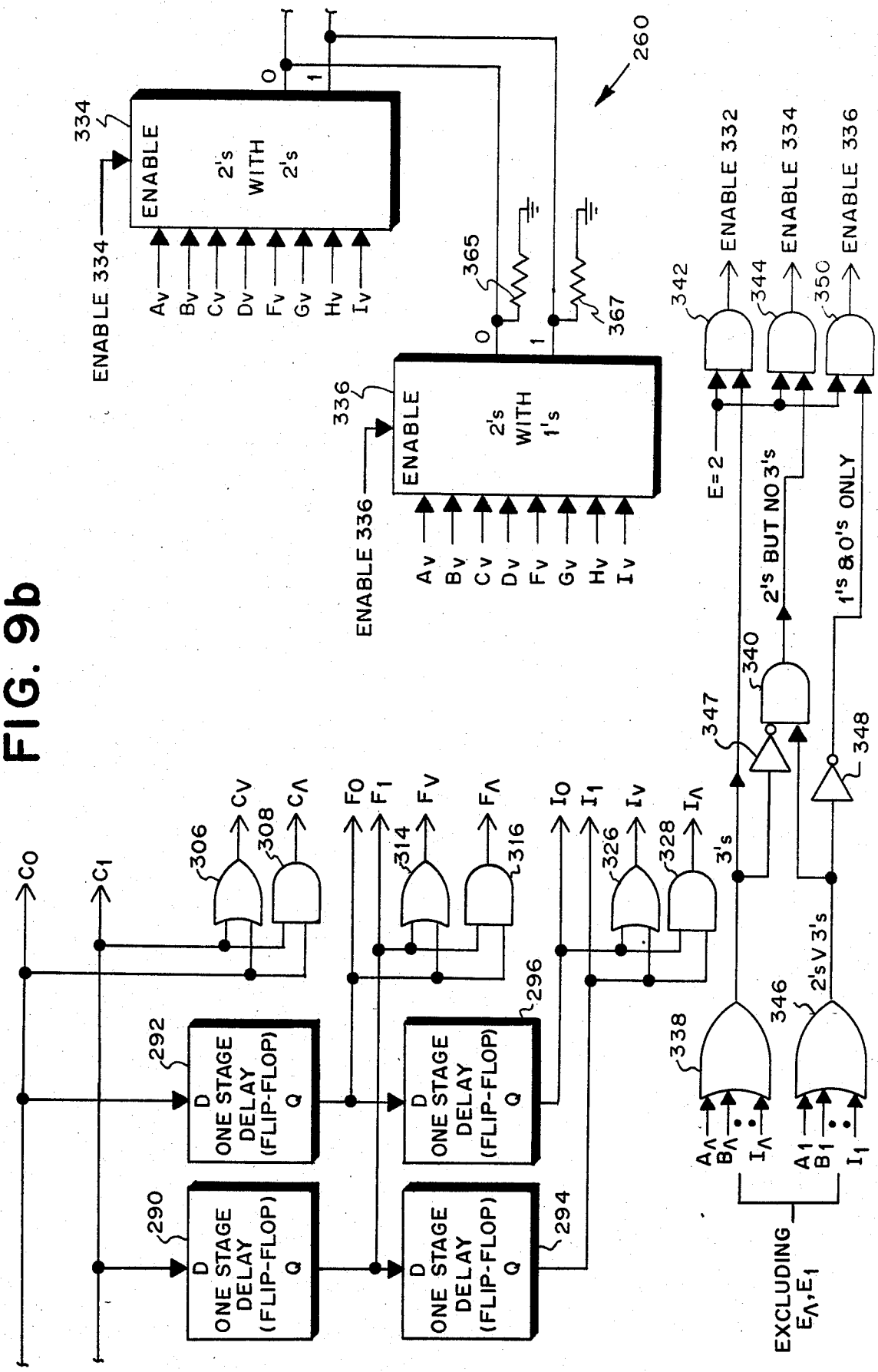
Figure 9C:
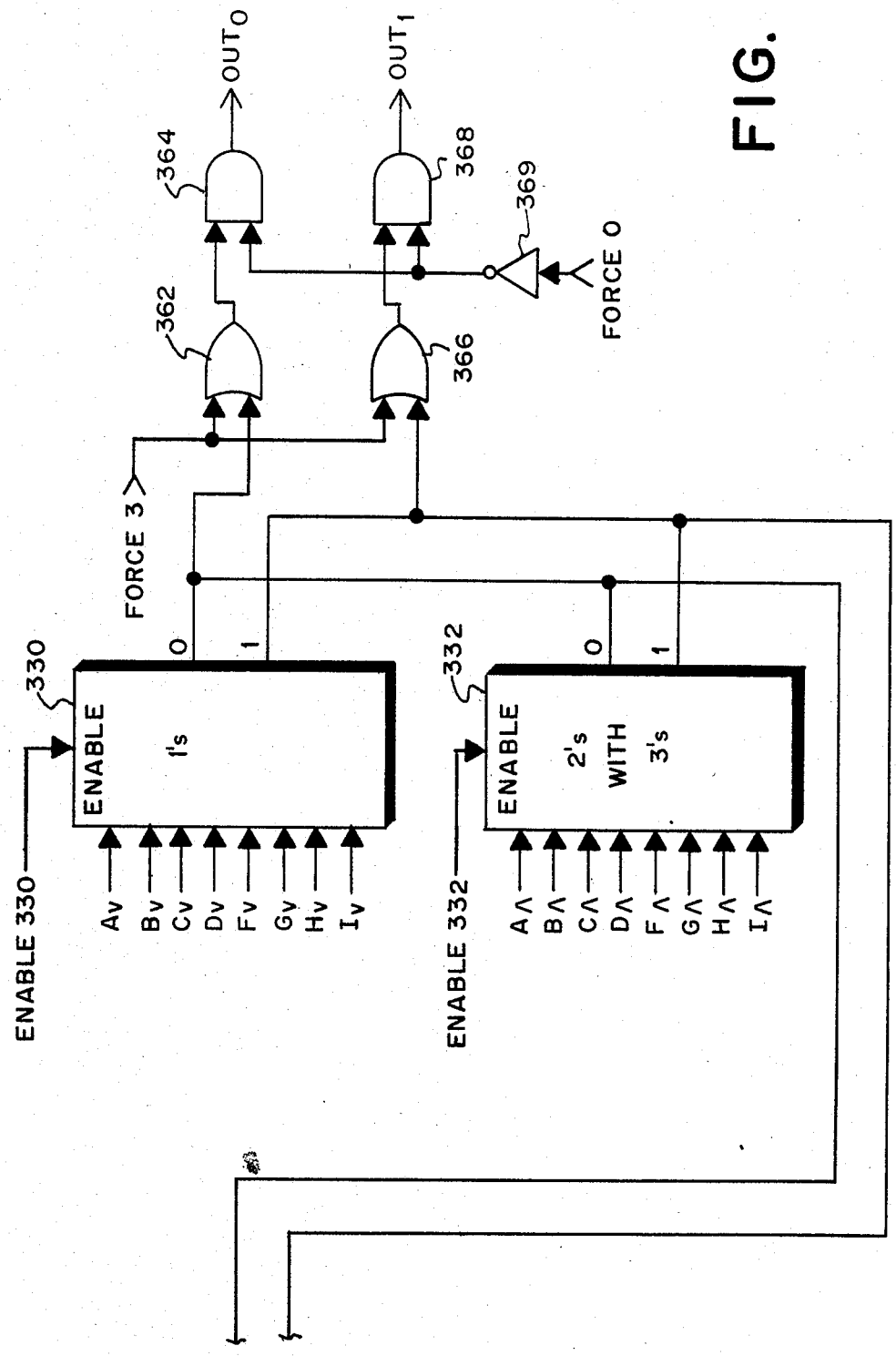

Referring to FIG. 8, a plurality of convolver circuits are arranged in parallel and designated as 250. Each parallel convolver circuit 252-258 which is preferably of the type illustrated as 165 in FIG. 5, receives a digitized video input signal and performs a weighted convolution thereon as previously described. Thus, the throughput of the system is improved. Further, as illustrated in FIG. 8, each convolver 252-258 is advantageously followed by three matrix filters M, which are advantageously of the type illustrated as 210 in FIG. 7, although a greater or lesser number of matrix filters M may be utilized, as desired. Each convolver 252-258 and its subsequent matrix filters M may be characterized as one Character Thinner (CT). Additional convolver circuits and matrix filters M may be connected in series with the initial CTs, as illustrated in FIG. 8, to provide further thinning based on the size and magnification of the original object to be thinned.

Figure 9:
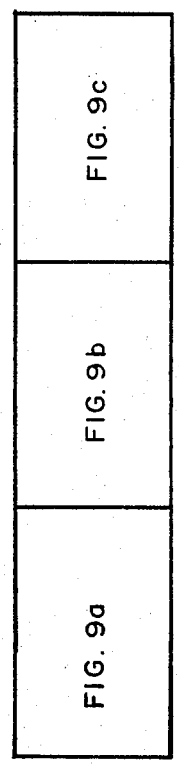
FIG. 9 (FIGS. 9a–9c), is a block diagram of another matrix filter circuit which utilizes parallel matrices.
Figure 7B:
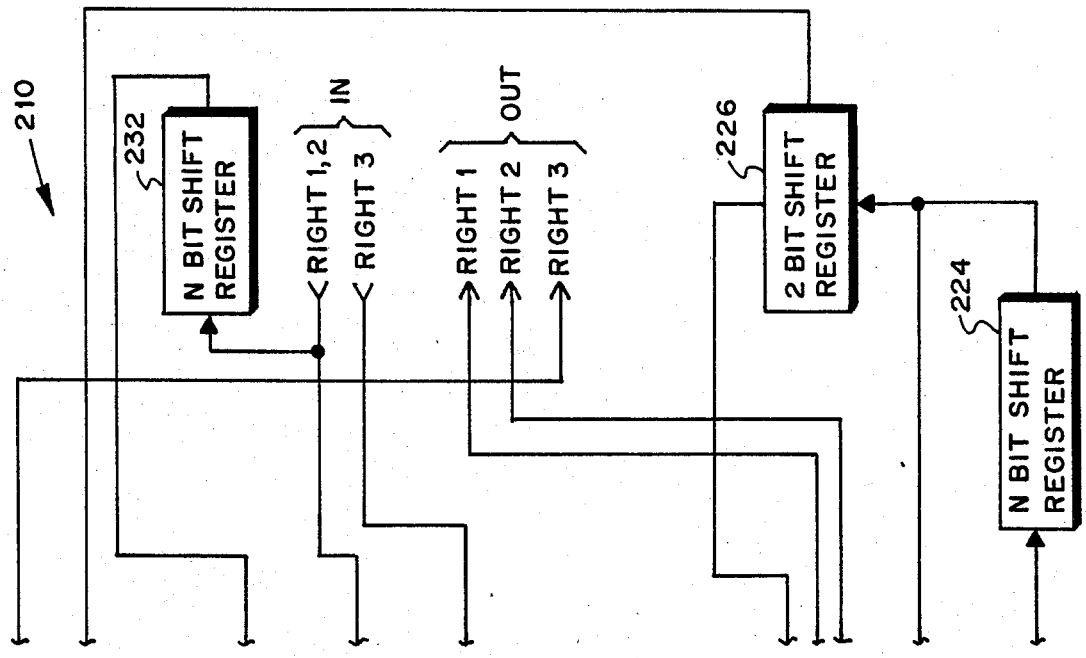

Referring to FIG. 9, another matrix filter circuit is designated at 260. In contrast with the matrix filter circuit 60 of FIG. 3 in which the double-entry table 70 is programmed into the PROM 64, the matrix filter circuit 260 utilizes the information from the pixels of value 3(11) in a dynamic or active way. When this is done, a plurality of parallel filter matrices are constructed to immediately filter each pixel once in accordance with its value and the values of the pixels in its 3×3 neighborhood, thereby increasing the speed of the thinning process.

Specifically, if the pixel value is 1, the 1's, 2's and 3's present in the 3×3 neighborhood are made 1's and the 0's are made 0, and the filter matrix illustrated in FIG. 11 as 370 is applied in the same manner as the filter matrix 70 of FIG. 10. However, if the pixel value is 2, the values in its 3×3 neighborhood are analyzed and one of three filter matrices is applied as follows. If there are pixels of value 3 present in the 3×3 neighborhood, the 3's are made 1's and the 2's, 1's and 0's are made 0's. The filter matrix illustrated in FIG. 12 as 375 is then applied. If there are no pixels of value 3 present in the 3×3 neighborhood, but pixels of value 2 are present, 2's and 1's are made 1's and the 0's are made 0. The filter matrix illustrated in FIG. 13 as 380 is then applied. If there are no pixels of value 3 or 2 in the 3×3 neighborhood, but only 1's and 0's, the filter matrix illustrated in FIG. 14 as 385 is applied.

If desired, the filter matrix 370 illustrated in FIG. 11 and the filter matrix 385 illustrated in FIG. 14 can be combined into one matrix. Specifically, if the pixel has a value of 1 or a value of 2 and no 2's or 3's are present in its 3×3 neighborhood this combined filter matrix, which is identical to filter matrix 370 of FIG. 11, is applied. With regard to other pixels of value 2, the filter matrix 375 of FIG. 12 is applied if 3's are present in the 3×3 neighborhood and the filter matrix 380 of FIG. 13 is applied if there are no 3's in the 3×3 neighborhood, but 2's are present in the neighborhood.

The matrix filter circuit 260 receives its pixel input from a convolver circuit, such as illustrated in FIGS. 2, 4 or 5, on lines 262 and 264. When pixel $P+N+1$, see the neighborhood 62 of FIG. 3, appears on lines 262 and 264 it also appears at $A_0$ and $A_1$. The pixel $P+N+1$ is also applied to a pair of N bit shift registers 266 and 268 which result in pixel $P+1$ at $B_0$ and $B_1$. The output from the shift registers 266 and 268 is applied to another pair of N bit shift registers 270 and 272 resulting in pixel $P-N+1$ at $C_0$ and $C_1$.

The pixel $P+N+1$ is also applied to a pair of 1 stage delay flip-flops 274 and 276, resulting in pixel $P+N$ at $D_0$ and $D_1$. The $P+N$ pixel output of the flip-flops 274 and 276 is supplied to another pair of 1 stage delay flip-flops 278 and 280, resulting in pixel $P+N-1$ at $G_0$ and $G_1$.

The output of shift registers 266 and 268 is supplied to a pair of one stage flip-flops 282 and 284, resulting in pixel P at $E_0$ and $E_1$. The pixel output of flip-flops 282 and 284 is supplied to another pair of one stage delay flip-flops 286 and 288, resulting in pixel $P-1$ at $H_0$ and $H_1$.

The output of shift registers 270 and 272 is supplied to a pair of one stage delay flip-flops 290 and 292, resulting in pixel $P-N$ at $F_0$ and $F_1$. The pixel output of flip-flops 290 and 292 is supplied to another pair of one stage delay flip-flops 294 and 296, resulting in pixel $P-N-1$ at $I_0$ and $I_1$.

The pixel outputs $A_0$ and $A_1$ are applied to OR gate 298 resulting in an output $A_v$. Likewise, the pixel outputs $A_0$ and $A_1$ are also applied to AND gate 300 resulting in an output A . Thus, output $A_v$ will be 1 unless the pixel $P+N+1$ has the value 0 and output A will be 0 unless the pixel $P+N+1$ has the value 3. Likewise, the outputs $B_0$ and $B_1$ are applied to OR gate 302 and AND gate 304 resulting in outputs $B_v$ and B , respectively; the outputs $C_0$ and $C_1$ are applied to OR gate 306 and AND gate 308 resulting in outputs $C_v$ and C , respectively; the outputs $D_0$ and $D_1$ are applied to OR gate 310 and AND gate 312 resulting in outputs $D_v$ and D , respectively; the outputs $F_0$ and $F_1$ are applied to OR gate 314 and AND gate 316 resulting in outputs $F_v$ and F , respectively; the outputs $G_0$ and $G_1$ are applied to OR gate 318 and AND gate 320 resulting in outputs $G_v$ and G , respectively; the outputs $H_0$ and $H_1$ are applied to OR gate 322 and AND gate 324, resulting in outputs $H_v$ and H , respectively; and the outputs $I_0$ and $I_1$ are applied to OR gate 326 and AND gate 328 resulting in outputs $I_v$ and I , respectively. As was true with respect to the outputs $A_v$ and A , it is apparent that each output $B_v-D_v$ and $F_v-I_v$ will be 1 unless the value of its corresponding pixel is 0 and that each output B –D and F –I will be 0 unless the value of its corresponding pixel is 3.

The outputs $A_v-I_v$ are applied to a PROM 330 which is coded in accordance with the double-entry table or filter matrix 370 of FIG. 11 for pixels having a value of 1. The outputs A –I are applied to a PROM 332 which is coded in accordance with the double-entry table or filter matrix 375 of FIG. 12 for pixels having a value of 2 with pixels of value 3 present in their neighborhoods. The outputs $A_v-I_v$ are also applied to PROM 334 which is coded in accordance with the double-entry table or filter matrix 380 of FIG. 13 for pixels having a value of 2 with no pixels of value 3, but with pixels having a value of 2 present in their neighborhoods. Finally, the outputs $A_v-I_v$ are also applied to PROM 336 which is coded in accordance with the double-entry table or filter matrix 385 of FIG. 14 for pixels of having a value of 2 with only pixels having a value of 0 or 1 present in their neighborhoods.

The outputs A –I are also applied to an OR gate 338 which provides a high output only when one or more pixels of value 3 are present in the pixel neighborhood. The output from the OR gate 338 is applied to AND gate 342 and through inverter 347 to AND gate 340. The output of AND gate 340 is applied to AND gate 344.

Outputs $A_1-D_1$, and $F_1-I_1$ are applied to an OR gate 346 which provides a high output only when one or more pixels of value 2 or 3 are present in the pixel neighborhood. The output from the OR gate 346 is applied to AND gate 340. The AND gate 340 provides a high output indicating the presence of pixels of value 2 in the neighborhood, only when the output of OR gate 338 is low (indicating no 3's are present) and the output of OR gate 346 is high (indicating the high output is a result of pixels of value 2 being present in the neighborhood).

The output from the OR gate 346 is also inverted by inverter 348 and applied to AND gate 350. Thus, the output of inverter 348 will be high only when the output of OR gate 346 is low, indicating that only pixels of value 0 or 1 are present in the neighborhood.

The AND gates 342, 344 and 350 also receive a pixel value signal E=2 from a 2:4 demultiplexer 360. The demultiplexer 360 receives input signals $E_0$ and $E_1$ representing the binary value of the pixel whose neighborhood is being examined. The pixel E may have a value of 0, 1, 2 or 3. Therefore, input signals $E_0$ and $E_1$ will have the binary value 00, 01, 10 or 11, respectively. If $E_0$ and $E_1$ have the binary value 00, the output of the demultiplexer 360 is 0 and the Force 0 output is active. If $E_0$ and $E_1$ have the binary value 01, the output of the demultiplexer 360 is 1 and the Enable PROM 330 output is active. If $E_0$ and $E_1$ have the binary value 10, the output of the demultiplexer 360 is 2 and the E=2 output is active. If $E_0$ and $E_1$ have the binary value 11, the output of the demultiplexer 360 is 3 and the Force 3 output is active.

Thus, if the pixel E has the value 1, the demultiplexer 360 provides an output signal Enable which enables the PROM 330. If the pixel P has the value 2, the demultiplexer 360 provides an output signal E=2 to AND gates 342, 344 and 350. AND gate 342 will then provide a high output enable signal to enable PROM 332 if pixels having a value of 3 are present in the pixel E neighborhood. AND gate 344 will provide a high output enable signal to enable PROM 334 if pixels having a value of 2 are present, but pixels having a value of 3 are not present in the pixel E neighborhood. AND gate 350 will provide a high output enable signal to enable PROM 336 if only pixels having a value of 0 or 1 are present in the pixel P neighborhood.

The outputs of the PROMs 330, 332, 334 and 336 are applied to a pair of OR gates 362 and 366. The output of OR gate 362 is applied to AND gate 364 and the output of OR gate 366 is applied to AND gate 368. The Force 3 signal from the demultiplexer 360 is applied to the other inputs of OR gates 362 and 366. The Force 0 signal from the demultiplexer 360 is inverted by inverter 369 and applied to the other inputs of AND gates 364 and 368. The output of PROMS 330, 332, 334 and 336 is pulled toward ground by pull-down resistors 365 and 367 in the absence of any signals present at the PROM outputs.

Thus, if the pixel P has the value 0, a Force 0 signal present at the output of the demultiplexer 360 causes the outputs of the AND gates 364 and 368 to go low resulting in the output signal 00. However, if pixel P has the value 3, a Force 3 signal present at the output of the demultiplexer 360 will cause a high signal at the outputs of OR gates 362 and 366 and a high signal at the outputs of AND gates 364 and 368 resulting in the output signal 11. If pixel P has the value 1, PROM 330 is enabled resulting in outputs 00 or 11 in accordance with the double-entry table 370 of FIG. 11. If the pixel P has the value 2, one of the PROMs 332, 334, or 336 in enabled in accordance with the output of OR gate 338 and AND gate 346; PROM 332 in enabled if pixels having a value of 3 are present in the neighborhood; PROM 334 is enabled if pixels having a value of 2 are present, but no pixels having a value of 3 are present in the neighborhood; and PROM 336 is enabled if only pixels having a value of 1 or 0 are present in the neighborhood.

Figures 15, 16:
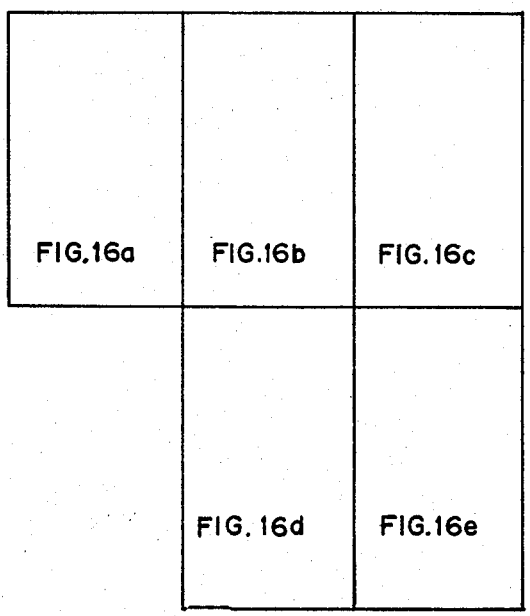
FIG. 15 is a representation of a double-entry table or PROM matrix for use in circuits similar to the matrix filter circuits of FIGS. 3, 4, 7, 8 and 17 to provide further or anorexic thinning subsequent to the application of the matrix filter circuits.
FIG. 16 (FIGS. 16a–16e), is a block diagram of another embodiment of a convolver circuit in accordance with the present invention.
Figure 16A:
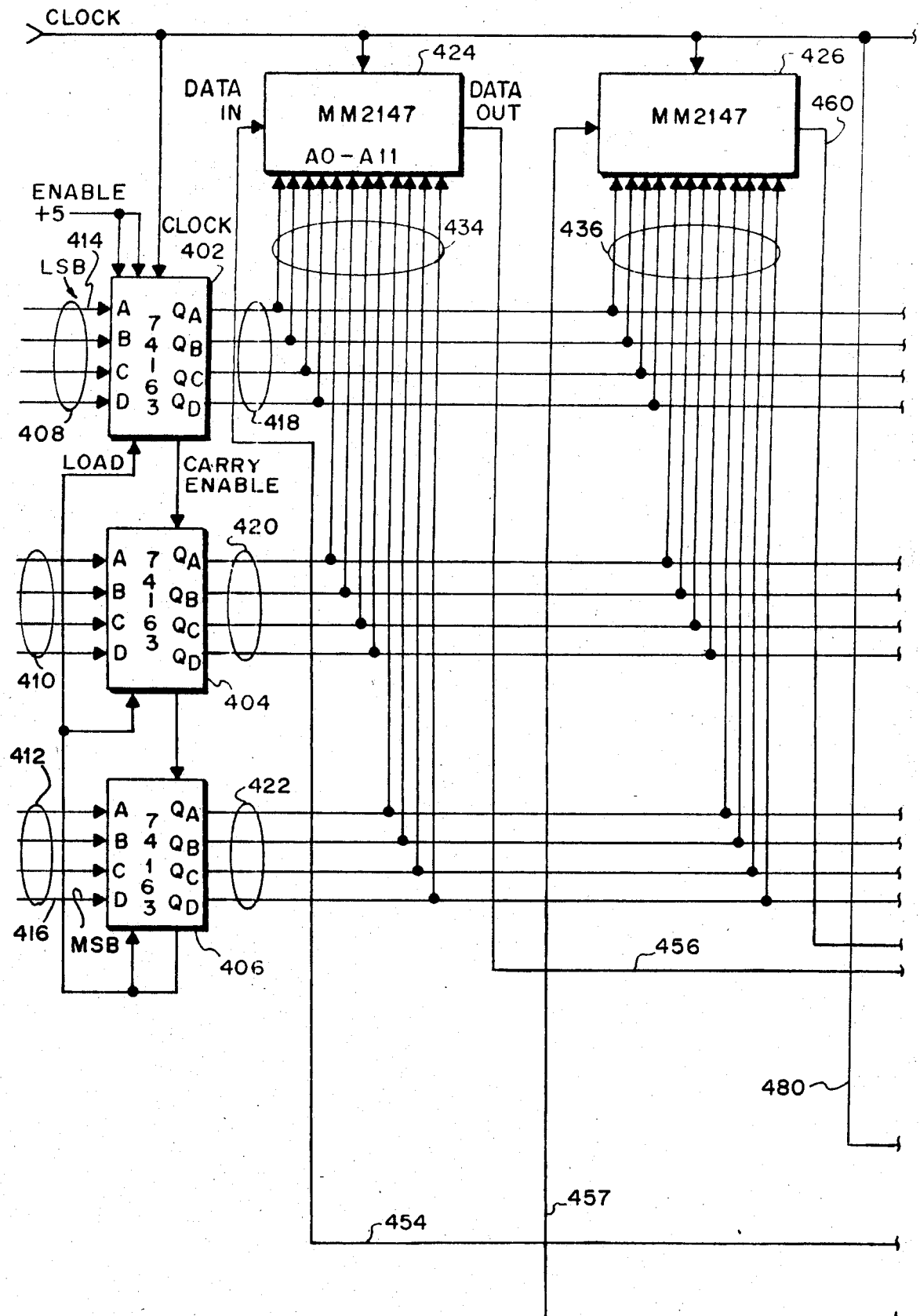
Figure 16B:
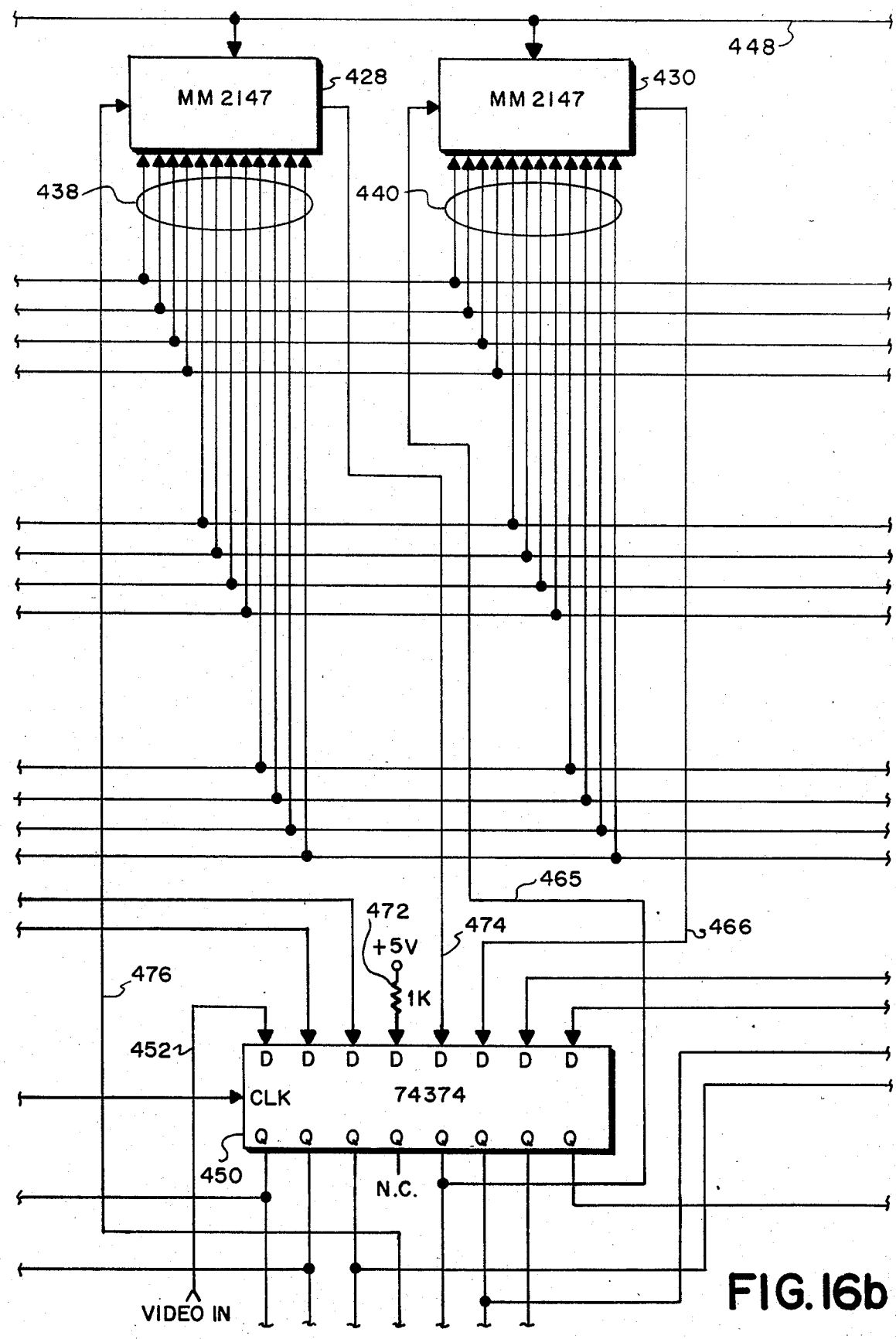
Figure 16C:
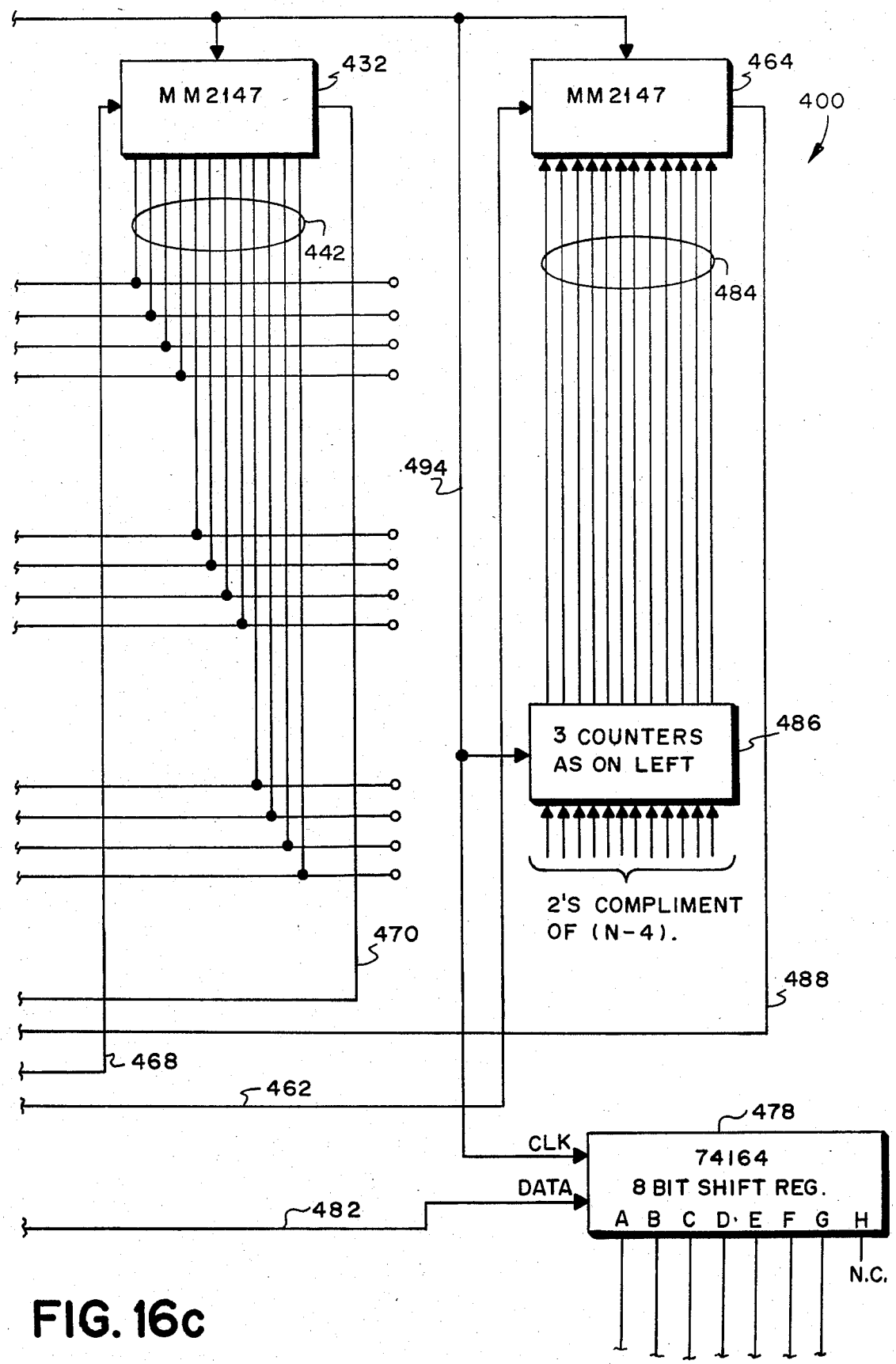
Figure 16D:
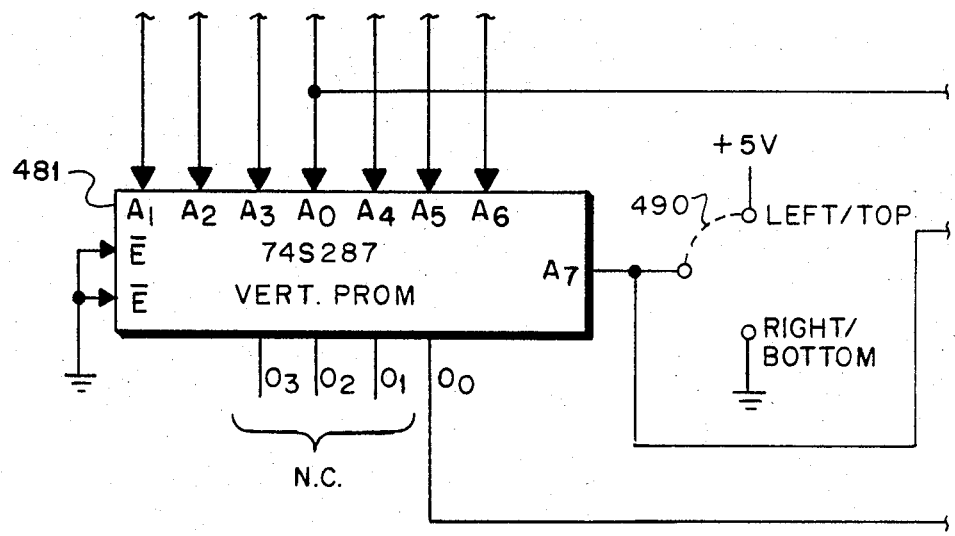
Figure 16E:
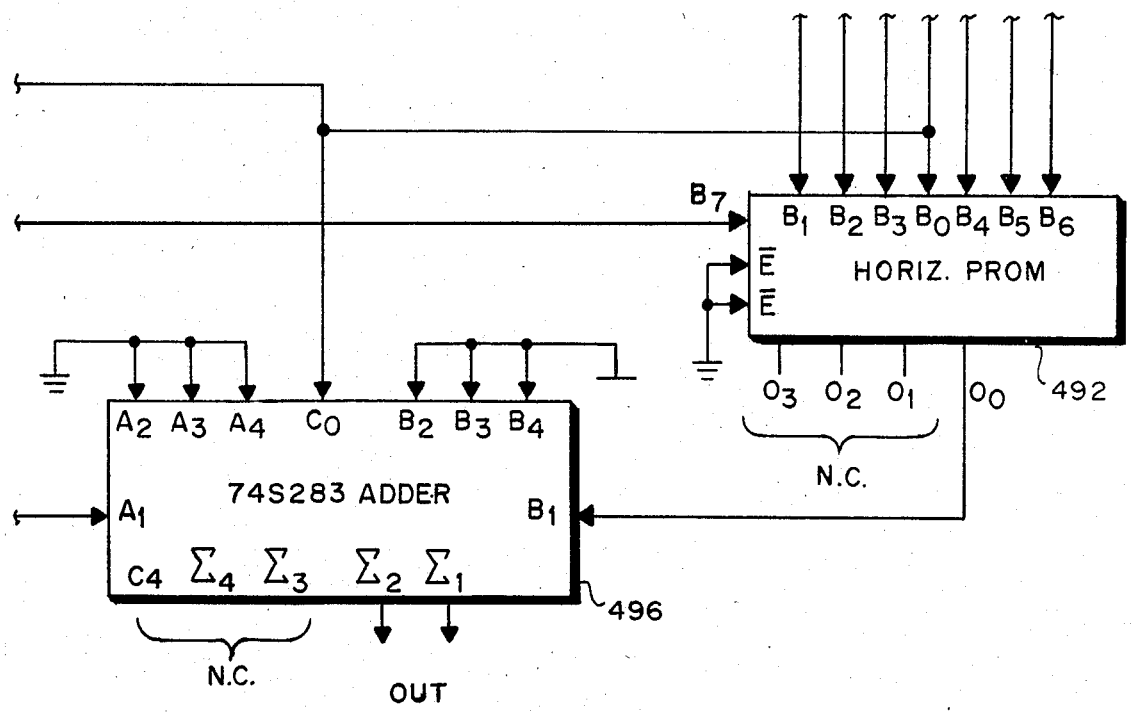

Referring to FIG. 16, another embodiment for the convolver circuit, designated as 400, is illustrated. In FIG. 16, RAMs have been substituted for the shift registers previously utilized in the embodiments of FIGS. 2, 4 and 5. Counters 402, 404 and 406 have their input lines 408, 410 and 412, respectively, tied low or high to represent the number of pixels per scan line. The number is the two's-complement. Therefore, 64 pixels per line=111111000000.

The line 414 of input lines 408 representing the least significant bit and the adjacent three bits on lines 408 are coupled to the counter 402. The counter 402 also receives a clock signal from the clock, an enable signal from a positive voltage source, here +5 V, and a load data signal from the counter 406.

The counter 402 transmits a Carry and Enable signal to the counter 404 which also receives the next four bits on lines 410 and which in turn transmits a Carry and Enable signal to counter 406. Counter 406 receives the most significant bit on line 416 and the adjacent three bits on lines 412 and transmits a load signal to itself and to counters 404 and 402.

The output lines 418, 420 and 422 from counters 402, 404 and 406, respectively, are coupled to RAMs 424, 426, 428, 430 and 432 via leads 434, 436, 438, 440 and 442. Each of the RAMs 424, 426, 428, 430 and 432 receives a Write Enable signal from the system clock on line 448.

The binary video input signal from the scanning array is applied to a first input terminal of an 8 bit register 450 over line 452. Register 450 supplied input data from its first output terminal over line 454 to RAM 424. The output data from RAM 424 is supplied to a second input terminal of the register 450 over line 456. The register 450 supplies input data from its second output terminal to RAM 426 over line 457. The output data from RAM 426 is supplied to a third input terminal of the register 450 over line 460. The register 450 also supplies input data from its third output terminal over line 462 to RAM 464. The output data from RAM 464 is supplied to the last (eighth) input terminal of register 450. The fourth output terminal of the register 450 is not connected. The fifth output terminal of the register 450 supplies input data over line 465 to RAM 430. The output from RAM 430 is supplied to the sixth input terminal of the register 450 over line 466. The sixth output terminal of register 450 supplies input data over line 468 to RAM 432. The output from RAM 432 is supplied to the seventh input terminal of register 450 over line 470.

The fourth input to the register 450 is provided by the +5 V bias coupled through a 1K current limiting resistor 472. The fifth input to the register 450 is supplied from RAM 428 over line 474. The input to the RAM 428 is supplied over line 476 which is coupled to the output terminal D ($B_0$) of an 8 bit parallel output shift register 478. The register 450 also receives a clock signal over line 480.

A vertical PROM 481 receives an input signal at its first input terminal representing pixel $A_1$ from the first output terminal of register 450; an input signal at its second input terminal representing pixel $A_2$ from the second output terminal of register 450; an input signal at its third input terminal representing pixel $A_3$ from the third output terminal of register 450; an input signal at its fourth input terminal representing pixel $A_0$ over line 476; an input signal at its fifth input terminal representing pixel $A_4$ from the fifth output terminal; an input signal at its sixth input terminal representing pixel $A_5$ from the sixth output terminal; and an input signal at its seventh input terminal representing pixel $A_6$ from the seventh output terminal. The eighth output from the register 450 conveys data to the eight bit parallel output shift register 478 over line 482.

The RAM 464 receives pixel input addresses over lines 484 which are connected to the output of 3 counters represented by the block 486. The counters 486 have their input lines tied high or low to represent the two's—complement of N−4. For example if N=64, the two's—complement of N−4 would be 111111000100. Similar to RAMs 424, 426, 428, 430 and 432, the RAM 464 receives a Write Enable signal from the system clock on line 448. The data output from RAM 464 is transmitted to the last input terminal of the register 450 over line 488.

Vertical PROM 481 and horizontal PROM 492 advantageously include twice the data storage capacity as required to store the descriptors for the left and right side thinning for the horizontal convolution and the descriptors for top and bottom thinning for the vertical convolution. With this arrangement, a switch 490 is utilized to alternate between the descriptors in accordance with the center of the convolution, i.e., left and top or right and bottom, as desired.

Each input pixel to the register 450 is delayed N bits by the RAMS 424, 426, 428, 430 and 432. That is, if the video input signal on line 452 represents pixel P+3N, the input to the vertical PROM terminal $A_1$ will be P+3N. This pixel is applied to the RAM 424 over line 454 causing an N bit delay in this signal, thereby resulting in the appearance of signal P+2N on line 456 and at the vertical PROM terminal $A_2$. Similarly, the pixel P+2N is applied to the RAM 426 over line 457 causing an N bit delay in this signal, thereby resulting in the appearance of signal P+N on line 460 and at the vertical PROM terminal $A_3$.

The pixel P+N is applied to the data input of RAM 464 over line 462, resulting in an input signal to the register 450 over line 488 of P+4 due to the N−4 bit delay introduced by RAM 464. The output from register 450 corresponding to the P+4 input is applied as data to the input of the 8 bit parallel output shift register 478 over line 482. The clock signal is also applied thereto over line 494. The 8 bit parallel output shift register 478 provides output pixels P+3, P+2, P+1, P, P−1, P−2, and P−3 at its output terminals A, B, C, D, E, F, and G, respectively. Terminal H is not connected. These outputs are connected to the inputs of horizontal PROM 492. The output from the horizontal PROM 492 is 0 or 1 in accordance with whether the decriptors encoded in the horizontal PROM 492 represent the number $B_0$-$B_6$ or a combination thereof. The output of the horizontal PROM 492 is applied as one input to an adder chip 496. The other input to the adder chip 496 is provided by terminal D of the 8 bit parallel output shift register 478 which corresponds to the central pixel in question P. This central pixel is also applied to terminal $A_0$ of the vertical PROM 481 and to the data input of RAM 428 causing an N bit delay in this signal, thereby resulting in the appearance of the signal P−N on line 474 and at the vertical PROM terminal $A_4$. The pixel P−N is applied to the RAM 430 over line 465 causing an N bit delay in this signal, thereby resulting in the signal P−2N on the line 466 and at the vertical PROM terminal $A_5$. Finally, the pixel P−2N is applied to the RAM 432 over line 468 causing an N bit delay in the signal, thereby resulting in the signal P−3N on line 470 and at the vertical PROM terminal $A_6$. The output from the vertical PROM 481 is 0 or 1 in accordance with whether the descriptors encoded in the vertical PROM 481 represent the number $A_0$-$A_6$ or a combination thereof. Thus, the output of the adder chip 496 will be the binary numbers 00, 01, 10 or 11 in accordance with the binary value of its three inputs.

Figure 17:
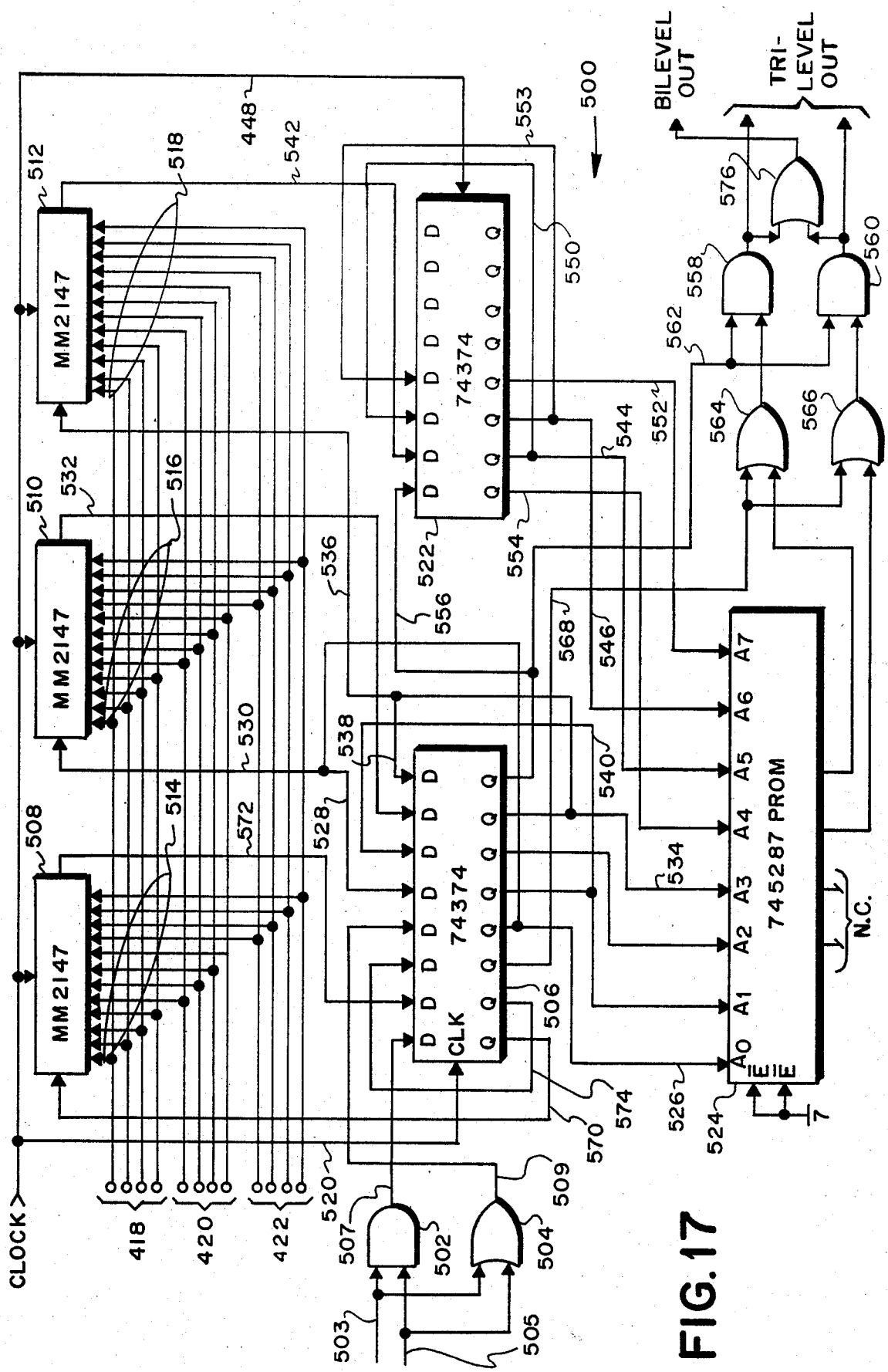
FIG. 17 is a block diagram of another embodiment of a matrix filter circuit in accordance with the present invention.

Referring to FIG. 17, the output from the adder chip 496 of FIG. 16 is applied to a matrix filter circuit designated a 500. Specifically, the output from the adder chip 496 is applied to the input of an AND gate 502 and an OR gate 504 over lines 503 and 505. The output of the AND gate 502 is applied to the first input terminal of a register 506 over line 507. The output of the OR gate 504 is applied to the fourth input terminal of the register 506 over line 509.

Output lines 418, 420 and 422 from the counters 402, 404 and 407 of FIG. 16, are coupled to RAMs 508, 510 and 512 via lines 514, 516 and 518 respectively. The RAMs 508, 510, and 512 also receive a Write Enable signal from the system clock on line 448 in the same manner as previously described with reference to the RAMs 424-432, and 464 of FIG. 16. Clock pulses are applied to the register 506 via line 520 which is coupled to line 448. Likewise, another register 522 receives clock pulses at one of its input terminals from line 448.

Unless both inputs to the AND gate 502 are high, the output of the AND gate 502 is low. However, the presence of two high signals at the input of the AND gate 502, indicating the presence of a pixel of value 3 or binary 11, results in the application of a high input to the first input terminal of the register 506. The presence of two low signals at the input of the OR gate 504, indicating the presence of a pixel of value 0 or binary 00, results in the application of a low input to the fourth input terminal of the counter. To facilitate understanding, it is assumed that the pixel present at the input of the AND gate 502 and OR gate 504 is P+N+1. Unless the value of the pixel is 0, i.e., if the pixel has a value of 1, 2, or 3, a high input will be present at the fourth input terminal of the register 506. This input to the fourth input terminal D appears at the fourth output terminal Q as pixel P+N+1 and is applied to the input $A_0$ of a thinning matrix PROM 524 over line 526. The output from the fourth output terminal Q is also applied to the fifth input terminal over line 528 and over line 530 to the data input terminal of RAM 510 resulting in a N bit delay in the output signal thereby providing the signal P+1 and its output terminal on line 532. Line 532 is coupled to the seventh terminal D of the register 506 resulting in an output at the seventh terminal Q of P+1 which is applied to the input $A_3$ of the thinning matrix PROM 524 over line 534. The output P+1 from line 534 is coupled to the data input of RAM 512 over line 536 and to the eighth input terminal of the register 506 over line 538. Thus, the terminal $A_0$ of the PROM 524 receives pixel P+N+1, and the terminal $A_1$ of the PROM 524 receives the pixel P+N as a result of the delay of 1 bit introduced in the pixel P+N+1 by the line 528 applying the output of the fourth output terminal Q to the fifth input terminal. The terminal $A_2$ of the PROM 524 receives the pixel P+N−1 as a result of a delay of 1 bit introduced in the pixel P+N by line 540 applying the output of the fifth output terminal Q to the sixth input terminal D. The terminal $A_3$ of the PROM 524 receives pixel P+1 from the seventh output terminal Q of the register 506 over line 534.

RAM 512 supplies pixel P−N+1 to the second input terminal D of the register 522 over line 542 as a result of the N bit delay in the input signal P+1. Thus, the pixel P−N+1 appears at the terminal $A_5$ of the PROM 524 from the second output terminal Q of counter 506 over line 544. The terminal $A_6$ of the PROM 524 receives the pixel P−N over line 546 as a result of a delay of 1 bit introduced in the pixel P−N+1 by line 550 applying the output of the second output terminal Q to the third input terminal D. Further, the terminal $A_7$ of the PROM 524 receives the pixel P−N−1 over line 552 as a result of a delay of 1 bit introduced in the pixel P−N by line 553 applying the output of the third output terminal Q to the fourth input terminal. Finally, the terminal $A_4$ of the PROM 524 receives the pixel P−1 over line 554 from the first output terminal Q of register 522. Pixel P is produced at the eighth output terminal Q of register 506 and applied to the first terminal D of register 522 over line 556. Pixel P is produced at the eight output terminal Q as a result of applying the output from the seventh output terminal Q to the input of the eight input terminal D over line 538.

The output from line 556 (pixel P) is also applied to the input terminals of AND gates 558 and 560 over line 562. Thus, output pixel P, representing the central pixel of pixel in question of the neighborhood 62, see Fix. 3, is applied as one input to each of the two AND gates 558 and 560. The other input to the AND gates 558 and 560 is provided from the outputs of OR gates 564 and 566, respectively. The OR gates 564 and 566 each receive one of their inputs from the PROM 524 according to the value 0(00), 2(10) or 3(11) assigned to the pixel P as a result of the neighborhood of values encoded in the PROM 524. The other inputs to the OR gates 564 and 566 are provided from the third output terminal Q of the counter 506 in the form of pixel P. This is obtained as follows. If the output of the AND gate 502 is high, i.e., both inputs are high, indicating a pixel of value 3(11) is present at terminals 503 and 505, the pixel P+N+1 is applied to the first terminal D of the register 506 over line 507. The output of the first output terminal Q of the register 506 in the form of pixel P+N+1 is applied to the data input of RAM 508 over line 570. The N bit delay of RAM 508 produces the pixel P+1 at its output terminal which is applied to the second input terminal Q of register 506 over line 572. The output from the second output terminal Q of the register 506 is applied to the third input terminal Q of the register 506 over line 574. This results in a 1 bit delay in the pixel input P+1, thereby producing the pixel P at the third output terminal Q of register 506, which output is coupled to the OR gates 564 and 566 by line 568.

If the input pixel on lines 503 and 505 has a value of 0(00), the output of the AND gate 502 will be 0 and therefore the outputs of OR gates 564 and 566 and the outputs of AND GATES 568 and 560 will be 0(00). Therefore, the output of the OR gate 576, which receives its inputs from AND gates 558 and 560, will be 0. If the input pixel on the lines 503 and 505 has a value of 3(11), the output of the AND gate 502 is high and delayed N+1 bits before being applied to the OR gates 564 and 566 resulting in a high output at the output terminals of the OR gates 564 and 566. Therefore, both inputs to the AND gates 558 and 560 are high, since both inputs results from pixel P. Thus, the outputs of the AND gates 558 and 560 are high representing the value 3(11). Moreover, the output from the OR gate 576 will also be 1. Otherwise, the OR gates 564 and 566 and AND gates 558 and 560 are controlled by the output from the PROM 524 in accordance with whether the pixel in question P is assigned the value 0(00), 2(10) or 3(11) by the PROM 524. That is, if the pixel P has the value 1(01) or 2(10), it is made a 0(00), 2(10) or 3(11) in accordance with the neighborhood encoded in the PROM 524. The bilevel video output signal is obtained from OR gate 576. If desired, a trilevel video output signal may be obtained from AND gates 558 and 560. The bilevel video output signal can be applied to a CRT or OCR system, as desired.

An anorexic or further thinning filter matrix may be utilized subsequent to the matrix filter circuits illustrated in FIGS. 3, 4, 7, 9, and 17, and may also be incorporated into the circuit of FIG. 8 to provide additional thinning by eliminating double line connections or overlapping lines. This is accomplished by utilizing a PROM programmed in accordance with the double-entry table 395 illustrated in FIG. 15. As previously discussed with reference to the double-entry table 70 illustrated in FIG. 10 for the use in the matrix filter circuits illustrated in FIGS. 3, 4, 7, 8 and 18, this double-entry table 395 is also constructed from an eight (8) bit neighborhood surrounding each pixel. The circuit for the anorexic filter matrix is identical with the circuitry illustrated in FIGS. 3, 4, 7, and 17 except that the respective thinning matrix PROMs therein are programmed to provide data outputs in accordance with the double-entry table 395 of FIG. 15.

As discussed in the aforementioned copending patent application, it should be understood that the convolution kernel may be in the form of a rectangle M×N rather than a square N×N. Further, a right sided convolution may be followed by a left sided convolution after application of the matrix filters, as desired.

It should be apparent to those skilled in the art that various modifications may be made in the present invention without departing from the spirit and scope thereof, as described in the specification and defined in the appended claims.

What is claimed is:

1. A system for providing a video output signal representing a thinned image from digitized video input signals representing discrete picture elements (pixels) of a scanned image, comprising:
    convolver circuit means for identifying those pixels which are to be retained as part of the thinned image, those pixels which are to be discarded from the thinned image, and contingent pixels which may be part of the thinned image; and
    matrix filter circuit means electrically coupled to said convolver means for determining which of the contingent pixels are to be discarded and which of the contingent pixels are to be retained as part of the video output signal representing a thinned image.

2. The system recited in claim 1, wherein:
    said convolver circuit means includes delay means for delaying the video input signals a predetermined number of pixels, first programmed memory means electrically coupled to said delay means for identifying those pixels of the vertical pixel strings of the original image which are to be preserved, second programmed memory means electrically coupled to said delay means for identifying those pixels of the horizontal pixel strings of the original image which are to be preserved, and means for combining the outputs of said first and second programmed memory means and the pixels of the original image to provide a combined output and applying the combined output to said matrix filter circuit means.

3. The system recited in claim 2, wherein:

said first and second programmed memory means includes PROMs.

4. The system recited in claim 2, wherein:
said delay means of said convolver circuit means includes a plurality of shift registers for supplying input signals to said first and second programmed memory means.

5. The system recited in claim 2, wherein:
said delay means of said convolver circuit means includes a plurality of RAMs for supplying input signals to said first and second programmed memory means.

6. The system recited in claim 1, wherein:
said matrix filter circuit means includes delay means for providing a neighborhood for each contingent pixel, programmed memory means for determining whether to preserve a contingent pixel in accordance with its neighborhood, and gate means for providing digital output signals representing the thinned image.

7. The system recited in claim 6, wherein:
said delay means of said matrix filter circuit means includes a plurality of shift registers for supplying input signals to said programmed memory means.

8. The system recited in claim 6, wherein:
said delay means of said matrix filter circuit means includes a plurality of RAMs for supplying input signals to said programmed memory means.

9. The system recited in claim 1, wherein:
said convolver circuit means includes delay means for delaying the video input signals a predetermined number of pixels, first programmed memory means electrically coupled to said delay means for identifying the pixels of the vertical pixel strings of the original image which are to be preserved, second programmed memory means electrically coupled to said delay means for identifying the pixels of the horizontal pixel strings of the original image which are to be preserved, and means for combining the outputs of said first and second programmed memory means and the pixels of the original image to provide a combined output and applying the combined output to said matrix filter circuit means;
said matrix filter circuit means including delay means for providing a neighborhood for each contingent pixel, programmed memory means for determining whether to preserve a contingent pixel in accordance with its neighborhood, and gate means for providing digital output signals representing the thinned image.

10. The system recited in claim 1, including:
a plurality of matrix filter circuit means electrically connected in series with one another and to said convolver circuit means for successively determining which of the remaining contingent pixels are to be discarded.

11. The system recited in claim 1, including:
a plurality of convolver circuit means electrically connected in parallel;
each of said convolver circuit means including a plurality of matrix filter circuit means electrically connected in series with one another and their respective convolver circuit means.

12. The system recited in claim 1, including:
anorexic filter circuit means electrically coupled to said matrix filter circuit means for eliminating overlapping lines in the thinned image.

13. The system recited in claim 12, wherein:
said anorexic filter circuit means includes delay means for providing a pixel neighborhood and programmed memory means for providing an output signal in accordance with the value encoded in said programmed memory means corresponding to the pixel neighborhood.

14. The system recited in claim 1, wherein:
said matrix filter circuit means includes a plurality of pixel neighborhood storage means for the contingent pixels;
enabling means for enabling one of said pixel neighborhood storage means in accordance with the pixel values present in the neighborhood for each contingent pixel.

15. The system recited in claim 14, including:
gate means coupled to said pixel neighborhood storage means for supplying signals thereto;
delay means for supplying signals to said gate means; and
shift register means for supplying signals to said delay means.

16. The system recited in claim 14, wherein said matrix filter circuit means includes:
demultiplexer means for decoding each pixel value;
gate means for forcing the output of said matrix filter circuit means to zero if the decoded pixel value from said multiplexer means for that pixel is zero and to three if the decoded pixel value from said multiplexer means for that pixel is three.

17. The system recited in claim 1, including:
a plurality of convolver circuit means electrically coupled in parallel;
at least one matrix filter circuit means connected in series with each of said convolver circuit means.

18. The system recited in claim 17, wherein:
each of said convolver circuit means includes means for receiving input signals from adjacent convolver circuit means and means for transmitting output signals to said adjacent convolver circuit means.

19. The system recited in claim 18, wherein:
each of said convolver circuit means includes a pair of multiplexers for receiving the input signals from said adjacent convolver circuit means, a pair of shift registers for receiving the output from said multiplexers, and signal output means coupled to said shift registers.

20. The system recited in claim 19, including:
timing means for supplying input signals to said pair of multiplexers and said signal output means for switching the same in accordance with the pixel count.

21. The system recited in claim 17, wherein:
said matrix filter circuit means includes gate means responsive to the pixel count and multiplexer means coupled to said gate means for switching the input to said multiplexer means to include inputs from adjacent matrix filter circuit means in response to the count received by said gate means.

22. A system for providing a video output signal representing a thinned image from digitized video input signals representing discrete picture elements (pixels) of a scanned image, comprising:
a plurality of convolver circuit means for identifying those pixels which are to be retained as part of the thinned image, those pixels which are excluded from the thinned image, and contingent pixels which may be part of the thinned image;

each of said convolver circuit means including delay means for delaying the video input signals a predetermined number of pixels, first programmed memory means electrically coupled to said delay means for identifying those pixels of the vertical pixel strings of the original image which are to be preserved, second programmed memory means electrically coupled to said delay means for identifying those pixels of the horizontal pixel strings of the original image which are to be preserved, and means for combining the outputs of said first and second programmed memory means and the pixels of the original image to provide a combined output;

at least one matrix filter circuit means electrically coupled to each of said convolver circuit means for determining which of the contingent pixels are to be discarded and which of the contingent pixels are to be retained as part of the video output signal representing a thinned image;

further, each of said matrix filter circuit means including delay means for providing a neighborhood for each contingent pixel, programmed matrix memory means for determining whether to preserve each contingent pixel in accordance with its neighborhood, and gate means for providing output digital signals representing the thinned image.

23. The system recited in claim 22, including:
at least three matrix filter circuit means electrically connected in series with one another and to their respective convolver circuit means for successively determining which of the remaining contingent pixels are to be discarded.

24. The system recited in claim 22, wherein:
said plurality of convolver circuit means are electrically connected in parallel;
each of said convolver circuit means including a plurality of matrix filter circuit means serially connected to one another and to at least one of said convolver circuit means.

25. The system recited in claim 22, wherein:
said delay means of said convolver circuit means including a plurality of RAMs for supplying input signals to said first and second programmed memory means.

26. The system recited in claim 22, wherein:
said delay means of said filter matrix circuit means includes a plurality of RAMs for supplying input signals to said programmed matrix memory means.

27. They system recited in claim 22, including:
anorexic filter circuit means electrically coupled to said matrix filter circuit means for eliminating overlapping lines in the thinned image.

28. They system recited in claim 22, wherein:
said delay means of said convolver circuit means includes a plurality of shift registers for supplying input signals to said first and second programmed memory means.

29. The system recited in claim 22, wherein:
said matrix filter circuit means includes a plurality of pixel neighborhood storage means for the contingent pixels;
enabling means for enabling one of said pixel neighborhood storage means in accordance with the pixel values present in the neighborhood for each contingent pixel.

30. The system recited in claim 29, including:
gate means coupled to said pixel neighborhood storage means for supplying signals thereto;
delay means for supplying signals to said gate means; and
shift register means for supplying signals to said delay means.

31. The system recited in claim 22, wherein said matrix filter circuit means includes:
demultiplexer means for decoding each pixel value;
gate means for forcing the output of said matrix filter circuit means to zero if the decoded pixel value from said multiplexer means for that pixel is zero and to three if the decoder pixel value from said multiplexer means for that pixel is three.

32. The system recited in claim 22, wherein:
each of said convolver circuit means includes means for receiving input signals from adjacent convolver circuit means and means for transmitting output signals to said adjacent convolver circuit means.

33. The system recited in claim 32, wherein:
each of said convolver circuit means includes a pair of multiplexers for receiving the input signals from said adjacent convolver circuit means, a pair of shift registers for receiving the output from said multiplexers, and signal output means coupled to said shift registers.

34. The system recited in claim 33, including:
timing means for supplying input signals to said pair of multiplexers and said signal output means for switching the same in accordance with the pixel count.

35. The system recited in claim 22, wherein:
said matrix filter circuit means includes gate means responsive to the pixel count and multiplexer means coupled to said gate means for switching the input to said multiplexer means to include inputs from adjacent matrix filter circuit means in response to the count received by said gate means.

* * * * *